US012744682B1

(12) United States Patent
White et al.

(10) Patent No.: US 12,744,682 B1
(45) Date of Patent: Sep. 22, 2026

(54) QUANTUM TIMESTAMPING

(71) Applicant: BRITISH TELECOMMUNICATIONS PUBLIC LIMITED COMPANY, London Greater London (GB)

(72) Inventors: Catherine White, London Greater London (GB); Claire Doyle, London Greater London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/850,018

(22) PCT Filed: Feb. 14, 2023

(86) PCT No.: PCT/EP2023/053577
§ 371 (c)(1),
(2) Date: Sep. 23, 2024

(87) PCT Pub. No.: WO2023/179970
PCT Pub. Date: Sep. 28, 2023

(30) Foreign Application Priority Data

Mar. 25, 2022 (GB) ..................................... 2204250

(51) Int. Cl.
*H04L 9/32* (2006.01)
*G06N 10/20* (2022.01)

(52) U.S. Cl.
CPC ........... *H04L 9/3297* (2013.01); *G06N 10/20* (2022.01)

(58) Field of Classification Search
CPC .............................. H04L 9/3297; G06N 10/20
(Continued)

(56) References Cited

U.S. PATENT DOCUMENTS 5,422,953 A 6/1995 Fischer
6,263,438 B1 7/2001 Walker et al.
(Continued)

FOREIGN PATENT DOCUMENTS

EP 1022640 A2 7/2000
EP 3654603 A1 5/2020
(Continued)

OTHER PUBLICATIONS

Ahmed Shokry; Device-independent Quantum Fingerprinting for Large Scale Localization; IEEE:2022; pp. 208-215.*
(Continued)

*Primary Examiner* — Monjur Rahim
(74) *Attorney, Agent, or Firm* — Nixon & Vanderhye P.C.

(57) ABSTRACT

A method of timestamping an item at a timestamping device is provided. The timestamping devices comprising a classical computing device and a quantum computing device. The method comprises at the classical computing device obtaining the item to be timestamped and determining an input token based on the received item. The method further comprises at the quantum computing device receiving a randomly generated quantum state from a verifier via a quantum channel wherein the randomly generated quantum state is received at time, t and wherein the method comprises using the timestamping device to combine the randomly generated quantum state with the input token to produce a timestamp proof token associated with the time, t.

19 Claims, 10 Drawing Sheets

(58) Field of Classification Search
USPC .......................................................... 713/178
See application file for complete search history.

(56) References Cited

U.S. PATENT DOCUMENTS

| | | | | |
|---|---|---|---|---|
| 7,340,610 | B1 * | 3/2008 | Yagawa | H04L 9/3236 713/176 |
| 11,188,523 | B1 | 11/2021 | Harold | |
| 11,356,247 | B1 * | 6/2022 | Carter, Jr. | H04L 9/0656 |
| 11,962,688 | B2 * | 4/2024 | Kent | G06F 7/588 |
| 12,200,114 | B1 * | 1/2025 | Stapleton | H04L 9/0861 |
| 12,231,416 | B1 * | 2/2025 | Stapleton | H04L 63/08 |
| 12,244,699 | B1 * | 3/2025 | Bordow | H04L 9/0866 |
| 2014/0358793 | A1 | 12/2014 | Pastawski et al. | |
| 2016/0226846 | A1 * | 8/2016 | Fu | H04L 63/062 |
| 2016/0359626 | A1 * | 12/2016 | Fu | H04L 9/0858 |
| 2017/0279540 | A1 * | 9/2017 | Tanizawa | H04B 10/70 |
| 2021/0083879 | A1 * | 3/2021 | Murialdo | H04L 9/0643 |
| 2021/0111883 | A1 * | 4/2021 | Kent | G06F 7/588 |
| 2021/0334237 | A1 * | 10/2021 | Coady | G06F 16/18 |
| 2023/0034274 | A1 * | 2/2023 | M T | H04L 9/14 |
| 2023/0110628 | A1 * | 4/2023 | Heckey | G06F 9/4881 |
| 2024/0057001 | A1 * | 2/2024 | Paczkowski | H04W 56/0015 |

FOREIGN PATENT DOCUMENTS

| | | |
|---|---|---|
| KR | 20200113716 A | 10/2020 |
| WO | 2019/106353 | 6/2019 |
| WO | 2021213631 A1 | 10/2021 |

OTHER PUBLICATIONS

International Search Report and Written Opinion of the ISA for PCT/EP2023/053577, mailed May 4, 2023, 16 pages.
Combined Search and Examination Report for GB 2204250.1, dated Dec. 2, 2022, 11 pages.
Examination Report under Section 18(3) for GB 2204250.1, dated Jul. 26, 2024, 4 pages.
Meng Long et al., “Reviewing the ISO/IEC Standard for Timestamping Services”, IEEE Communications Standards Magazine, IEEE, vol. 5, No. 3, Oct. 18, 2021, pp. 20-25.
Gilles Brassard et al., “A brief review on the impossibility of quantum bit commitment”, Dec. 10, 1997, 11 pages.
Gilles Brassard et al., “Defeating classical bit commitments with a quantum computer”, Sep. 13, 2018, 13 pages.
Ahto Buldas et al., “Efficient Quantum-Immune Keyless Signatures with Identity”, 2014, 14 pages.
Adrian Kent et al., “Flexible quantum tokens in spacetime”, Jan. 16, 2020, 8 pages.
Jun Yan, “General Properties of Quantum Bit Commitments”, Jinan University, Feb. 11, 2021, 47 pages.
Adrian Kent et al., “Practical quantum tokens without quantum memories and experimental tests”, Apr. 26, 2021, 39 pages.
“Trusted Timestamping (RFC 3161) in Digital Forensics—Metaspike”, Feb. 3, 2022, 9 pages.
Office Action for JP2024-556546 dated Aug. 19, 2025 (4 pages) and Translation (4 pages).
The Wayback Machine, “Background for Bit Commitment”, at least Oct. 1999, Background for Bit Commitment (archive.org) (8 pages).
Patents Act 1977: Examination Report under Section 18(3) dated May 8, 2025 issued for GB2204250.1 (4 pages).
International Preliminary Report on Patentability dated Oct. 10, 2024, issued for International Application No. PCT/EP2023/053577 (9 pages).

* cited by examiner

QUANTUM TIMESTAMPING

CROSS-REFERENCE TO RELATED APPLICATIONS

This application is the U.S. national phase of International Application No. PCT/EP2023/053577 filed Feb. 14, 2023 which designated the U.S. and claims priority to GB 2204250.1 filed Mar. 25, 2022, the entire contents of each of which are hereby incorporated by reference.

The present disclosure relates to a method of providing an item to be timestamped with a quantum timestamp at a timestamping device comprising a classical computing device and a quantum computing device.

BACKGROUND

Timestamping is an important application and if it is required to trust the party that is doing the timestamping, then some method is required that involves a trusted third party to generate proof.

However, any communication with a third party will generate a network delay. This adds uncertainty to the timestamp, which could have significant impact on the application of the timestamp since the speed at which items can be processed is in part dependent on the accuracy of the timestamp. One method of providing a verifiable timestamp would be to use a third party trusted verifier. If the third party, for example, receives an item (e.g. digital record) or hashed item (i.e. cryptographic hash of a digital record), optionally signed with a digital signature, from the timestamping entity, and then adds a digital timestamp to the digital record, and signs the entire resulting string with their own signature to the timestamped item, this will effectively classically provide a method of verification for the timestamp. However, there will be latency and uncertainty in the time taken to transmit the digital information to be verifiably timestamped to the third party over the network.

It is desirable to provide techniques that overcome this problem and enable a timestamping entity to provide timestamps without being required to first send the item to be timestamped to a third party.

The examples described herein are not limited to examples which solve problems mentioned in this background section.

SUMMARY

Examples of preferred aspects and embodiments of the invention are as set out in the accompanying independent and dependent claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of timestamping an item at a timestamping device is provided. The timestamping device comprising a classical computing device and a quantum computing device. The method comprises at the classical computing device obtaining the item to be timestamped and determining an input token based on the received item. The method further comprises at the quantum computing device receiving a randomly generated quantum state from a verifier via a quantum channel wherein the randomly generated quantum state is received at time, t and using the timestamping device to combine the randomly generated quantum state with the input token to produce a timestamp proof token associated with the time, t.

Since the randomly generated state cannot be cloned due to the no-cloning theorem and all the information from the quantum state cannot be extracted by measurement it is not possible to copy the received randomly generated quantum state. Thus, the above method enables an untrusted timestamping device to timestamp an item without needing to send the item to a third party since the timestamping device cannot reuse a received randomly generated quantum state for a subsequent timestamp.

In some examples using the timestamping device to combine the randomly generated quantum state with the input token comprises performing quantum operations on the randomly generated quantum state such that at least some of the quantum operations are related to the input token wherein performing quantum operations on the randomly generated quantum state comprises measuring the randomly generated quantum state to obtain the timestamp proof token associated with the time, t. By using quantum operations related to the input token enhanced security is given.

In some examples performing quantum operations on the randomly generated quantum state such that at least some of the quantum operations are related to the input token comprises measuring the quantum state to obtain the timestamp proof token based on the input token by using the input token to determine a sequence of measurement bases for measuring the randomly generated quantum state. Both the timestamping device and verifier may know the rules of how the measurement bases are chosen from the input token The classical computing device may be used to determine the set of measurement bases from the input token and the quantum computing device may then implement the measurements in the determined bases. Changing the measurement basis of a quantum state can for example comprise changing the state of an interferometer, for phase encoded photonic qubits, or the orientation of a polarisation beam splitter. This thus enables the timestamp proof token to be made dependent upon the input token.

In other examples, the method further comprises at the classical computing device, determining an input quantum state from the input token and at the quantum computing device preparing a quantum register in the input quantum state. The performing quantum operations on the randomly generated quantum state received from the verifier such that at least some of the quantum operations are related to the input token further comprises using a sequence of quantum gates to mix the input quantum state and the randomly generated quantum state before measuring the randomly generated quantum state. The mixing the input quantum state and the randomly generated quantum state may comprise entangling the two quantum states. In other examples mixing the input quantum state and the randomly generated quantum state may comprise generating non-classical correlations between the two quantum states (e.g. creating entanglement or quantum discord). In some examples the sequence of gates is a predetermined sequence of gates known by both the timestamping device and the verifier. In other examples the sequence of quantum gates may be chosen according to a known pattern (e.g. known by both the timestamping device and the verifier) such as using a part of the input token. The use of quantum gates to mix/entangle/generate correlations between the input quantum state and the randomly generated quantum state provides a way of making the quantum operations related to/dependent on the input state in a manner that is hard to forge classically without knowledge of the randomly generated quantum state.

In other examples performing quantum operations on the randomly generated quantum state such that at least some of the quantum operations are related to the input token comprises determining, at the classical computing device, a sequence of quantum operations based on the input token; and implementing, at the quantum computing device, the determined sequence of quantum operations on the randomly generated quantum state before measuring the randomly generated quantum state. The method of determining the sequence of quantum operations based on the input token can be known by both the timestamping device and the verifier. The implementing the determined sequence of quantum operations may comprise causing the quantum computing device to apply or perform the operations on the randomly generated quantum state. Again, using operations dependent upon the input token provides a way to make quantum operations dependent upon the input state in a manner that is hard to forge classically without knowledge of the randomly generated quantum state.

In some examples the method further comprises sending the timestamp proof token and the item to be timestamped and/or the input token to the verifier within a threshold period of time of obtaining the timestamp proof token. The method may also comprise in response to sending the timestamp proof token to the verifier, receiving confirmation of receipt and/or validity of the timestamp proof token. This enables the verifier to ensure each sent randomly generated quantum state is used at close to time, t, and is not stored for a later time.

In some examples the method further comprises receiving a request from the verifier for at least a portion of the timestamp proof token. The method then comprises providing the at least a portion of the timestamp proof token and the item to be timestamped and/or the input token to the verifier in response to the request. The portion of the timestamp proof token may comprise the entirety of the timestamp proof token. However, in other examples, the portion of the timestamp proof token may be a part of the timestamp proof token such that the verifier can verify the timestamp proof token. By having the verifier randomly request timestamp proof tokens, it becomes harder for the timestamping devices to store a randomly generated quantum state for later use as at any time it may be required to send a timestamp proof token from that randomly generated quantum state to the verifier.

In some examples, determining an input token based on the received item comprises determining the input token in dependence on at least a portion of a previous timestamp proof token in the item to be timestamped or the input token. Since the input token is based on the item to be timestamped, this means the input token will be based on a previous timestamp proof token. This acts as proof that previous randomly generated quantum states were used and not stored for later use.

In some examples, determining the input token in dependence on at least a portion of a previous timestamp proof token in the item to be timestamped or the input token comprises hashing the at least a portion of the previous timestamp proof token and incorporating the hash of the at least a portion of the previous timestamp proof token in the item to be timestamped or the input token. This provides a method of incorporating a portion of the previous timestamp proof token without revealing the previous timestamp proof token in the current item to be timestamped/input token. This also limits the degree to which the previous timestamp proof token lengthens the item to be timestamped/input token.

In some examples, the method further comprises storing the timestamp proof token on a distributed ledger such as a blockchain. In some cases the input token is determined in dependence on at least a portion of a previous timestamp proof token in the item to be timestamped or the input token comprises incorporating a previous entry or record of the distributed ledger (e.g. a previous block of a blockchain) in the item to be timestamped or the input token. This provides a convenient way of storing and accessing previous timestamp proof tokens and may also enable the previous timestamp proof tokens to be shared with the verifier.

In some examples obtaining the item to be timestamped comprises receiving an item to be timestamped prior to time t, or when no item to be timestamped has been received by time t, obtaining a predetermined value as the item to be timestamped. In other examples, a predetermined file or item can be used as the item to be timestamped if no other item to be timestamped has been obtained by time, t. This ensures the timestamping device performs a timestamping operation using the randomly generated quantum state even if no item needs to be timestamped. This enables the timestamping device to confirm to the verifier that the randomly generated quantum state has been used and not stored.

In some examples receiving a randomly generated quantum state from a verifier comprises receiving a first randomly generated quantum state from a first source of the verifier. The method then further comprises at the quantum computing device receiving a second randomly generated quantum state from a second source of the verifier via a quantum channel wherein the second randomly generated quantum state is received at time, t. Performing quantum operations on the randomly generated quantum state such that at least some of the quantum operations are related to the input token comprises performing quantum operations on the first and second randomly generated quantum states such that at least some of the quantum operations are related to the input token. The first and second source of the verifier are spatially distributed around the timestamping device. In further examples a third quantum state is also received via a quantum channel at time t from a third source of the verifier. Performing quantum operations on the randomly generated quantum state such that at least some of the quantum operations are related to the input token comprises performing quantum operations on the first, second and third randomly generated quantum states such that at least some of the quantum operations are related to the input token. The first, second and third source of the verifier are spatially distributed around the timestamping device. This prevents the timestamping device from giving inaccurate timestamps by moving closer to or further from the verifier to change the time at which it receives the randomly generated quantum state.

A method, performed at a verifier, of providing a randomly generated quantum state to a timestamping device is provided. The verifier comprises a classical computing device and a quantum computing device. The method performed at the verifier comprises at the quantum computing device preparing the randomly generated quantum state and sending the randomly generated quantum state to the timestamping device. The method performed by the verifier further comprises at the classical computing device recording a representation of the randomly generated quantum state, and recording a time, t', at which the randomly generated quantum state was sent to the timestamping device. Having the verifier securely prepare the randomly generated quantum state means the timestamping device does not know the randomly generated quantum state. This prevents the timestamping device performing any classical simulation of its operations or generating multiple copies of the randomly generated quantum state.

In some examples the method performed by the verifier further comprise verifying the timestamp. The method may thus further comprise at the classical computing device of the verifier receiving an indication of a time t, a timestamp proof token associated with the time t, and an item to be timestamped and/or an input token, determining a time t" based on the time t wherein the time t" represents a time at which a randomly generated quantum state received at the timestamping device at the time t would have been sent from the verifier, looking up a classical representation of a randomly generated quantum state associated with the time t", performing a classical simulation of quantum operations performed by the timestamping device, and based on the results of the classical simulation verifying that time t" matches time t'. As the verifier knows a classical representation of the randomly generated quantum state and the rules for turning the input token into quantum operations or having quantum operations act on the randomly generated quantum state and input quantum state it can perform a classical simulation of the operations performed. This enables the verifier to verify the timestamp proof token was likely obtained from the randomly generated quantum state and the input token generated by the item to be timestamped.

In some examples, the application relates to both the method performed by the timestamping device and the method performed by the verifier. In an example there is a method performed using a timestamping device and a verifier the method comprising: at a classical computing device of the timestamping device: obtaining an item to be timestamped; and determining an input token based on the obtained item; and at a quantum computing device of the timestamping device: receiving a randomly generated quantum state from the verifier via a quantum channel wherein the randomly generated quantum state is received at time, t; and wherein the method comprises using the timestamping device to combine the randomly generated quantum state with the input token to produce a timestamp proof token associated with the time, t; and using the verifier, to provide the randomly generated quantum state to the timestamping device by: at a quantum computing device of the verifier: preparing the randomly generated quantum state; and sending the randomly generated quantum state to the timestamping device; and at a classical computing device of the verifier: recording a representation of the randomly generated quantum state; and recoding a time, t', at which the randomly generated quantum state was sent to the timestamping device.

A timestamping device for timestamping an item is provided. The timestamping device comprises a classical computing device configured to obtain the item to be timestamped and determine an input token based on the obtained item. The system further comprises a quantum computing device configured to receive a randomly generated quantum state from a verifier via a quantum channel wherein the randomly generated quantum state is received at time, t, and wherein the timestamping device is configured to combine the randomly generated quantum state with the input token to produce a timestamp proof token associated with the time, t. As such a timestamping device configured to perform the above methods defined with respect to a timestamping device is provided.

A verifier for providing a randomly generated quantum state to a timestamping device is also provided. The verifier comprises a quantum computing device configured to prepare the randomly generated quantum state, and send the randomly generated quantum state to a timestamping device. The verifier further comprises a classical computing device configured to record a representation of the randomly generated quantum state and a time, t', at which the randomly generated quantum state was sent to the timestamping device. As such, a verifier configured to perform the above methods defined with respect to a verifier is provided.

In some examples the verifier is configured to carry out a link-latency calibration to determine a latency for sending the randomly generated quantum state to the timestamping device, and to randomly repeat the link-latency calibration.

In some examples, a system comprising both the timestamping device and the verifier described above is provided. An example system comprises: a timestamping device for timestamping an item and a verifier for providing a randomly generated quantum state to the timestamping device; the timestamping device comprising: a classical computing device configured to: obtain the item to be timestamped; and determine an input token based on the obtained item. The timestamping device has a quantum computing device configured to: receive the randomly generated quantum state from the verifier via a quantum channel wherein the randomly generated quantum state is received at time, t; and the timestamping device is configured to combine the randomly generated quantum state with the input token to produce a timestamp proof token associated with the time, t. The verifier comprises: a quantum computing device configured to: prepare the randomly generated quantum state; and send the randomly generated quantum state to a timestamping device; and a classical computing device configured to: record a representation of the randomly generated quantum state and a time, t', at which the randomly generated quantum state was sent to the timestamping device.

It will also be apparent to anyone of ordinary skill in the art, that some of the preferred features indicated above as preferable in the context of one of the aspects of the disclosed technology indicated may replace one or more preferred features of other ones of the preferred aspects of the disclosed technology. Such apparent combinations are not explicitly listed above under each such possible additional aspect for the sake of conciseness.

Other examples will become apparent from the following detailed description, which, when taken in conjunction with the drawings, illustrate by way of example the principles of the disclosed technology.

BRIEF DESCRIPTION OF THE DRAWINGS

Embodiments of the invention will be described, by way of example, with reference to the following drawings, in which:

FIG. 1_a_ shows an example method for timestamping performed by a timestamping device;

FIG. 1_b_ shows an example method for timestamping performed by a verifier;

FIG. 1_c_ shows an example method for verifying a timestamp performed by a verifier;

Figure 1A:
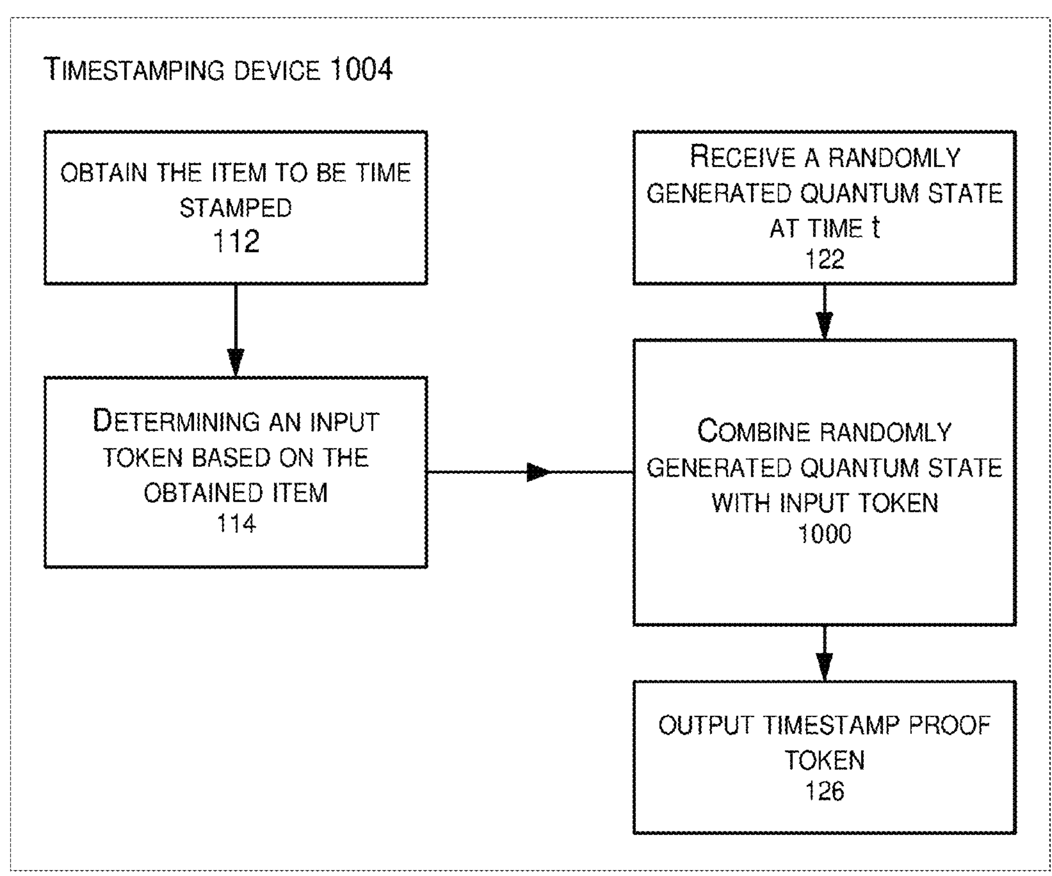
FIG. 1_aa_ is a schematic diagram of a timestamping device and a verifier.
Figure 1A:
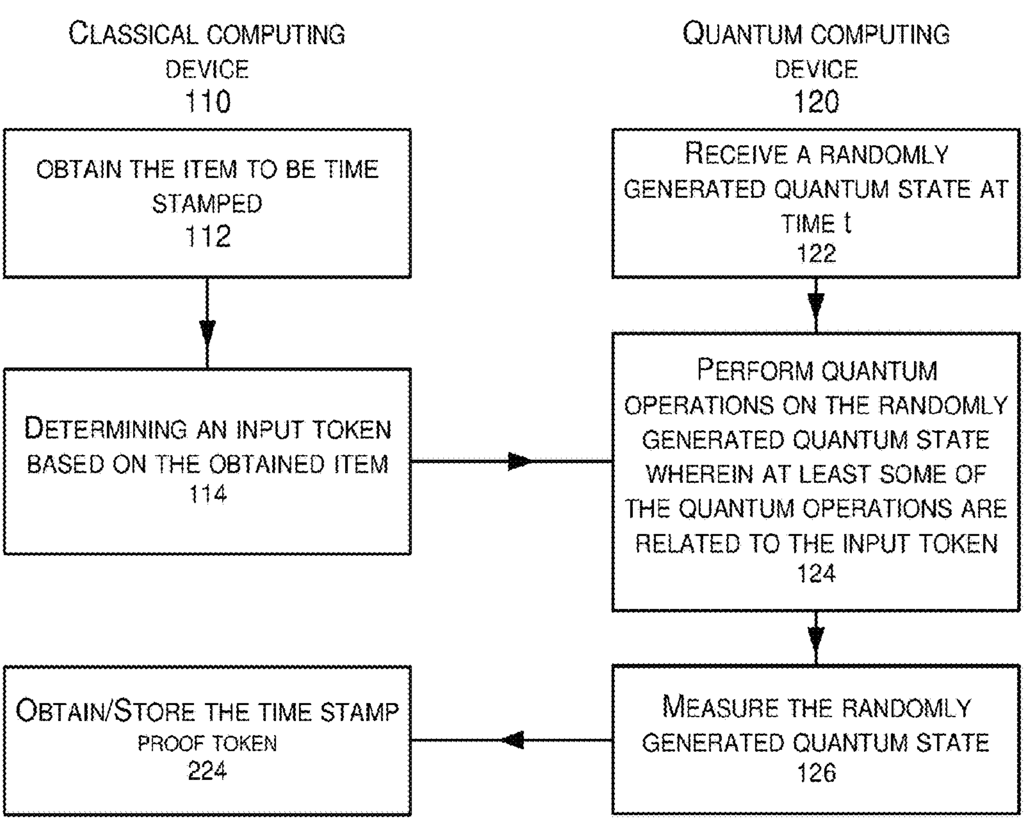

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is made for the purpose of illustrating the general principles of the present technology and is not meant to limit the inventive concepts claimed herein. As will be apparent to anyone of ordinary skill in the art, one or more or all of the particular features described herein in the context of one embodiment are also present in some other embodiment(s) and/or can be used in combination with other described features in various possible combinations and permutations in some other embodiment(s).

The classical methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The present disclosure relates to using a randomly generated quantum state received from a verifier to timestamp an item so that a timestamping device or timestamping entity can timestamp an item without being required to send it to a third party for verification.

FIG. 1*aa* shows a verifier 1002 and a timestamping device 1004 in a schematic manner. Within the timestamping device 1004 there is a schematic representation of an example method carried out by the timestamping device 1004. According to the example method, the timestamping device obtains 112 an item to be time stamped. A non-exhaustive list of examples of such an item is given later with reference to FIG. 1*a*. The timestamping device 1004 determines 114 an input token based on the obtained item.

The timestamping device receives 122 a randomly generated quantum state from the verifier 1002. The randomly generated quantum state is received at time t by the timestamping device 1004.

The timestamping device combines 1000 the randomly generated quantum state with the input token and in so doing creates a timestamp proof token. The timestamping device 1004 outputs 126 the timestamp proof token. The verifier is able to verify that it is statistically likely that the timestamp proof token was produced within an acceptable margin of a claimed time.

In an example, the verifier 1002 prepares a random stream of qubits/qudits and privately stores a record of the stream. The verifier 1002 sends the stream over a quantum channel to the timestamping device 1004, which can for example perform time-sensitive actions. The timestamping device combines a latest portion of the qubit/qudit stream received from the verifier with the input token, which in an example is an action ID. An action ID is a series of bits identifying a latest action it wishes to timestamp. The operation of combining 1000 produces a token which can be sent to the verifier, together with the action ID and a timestamp claim for the action, for verification. The verifier knows a protocol used to produce the timestamp proof token, as well as the latencies of the quantum channel used to communicate the stream of qubits/qudits and the channel used to communicate the timestamp proof token, so can use these together with its stored stream record to verify that it is statistically likely that the timestamp proof token was produced within an acceptable margin of the time claimed.

There are various ways in which the combining may be achieved in operation 1000. In some cases the combining operation 1000 comprises performing quantum operations on the randomly generated quantum state, wherein at least some of the quantum operations are related to the input token.

Figure 1B:
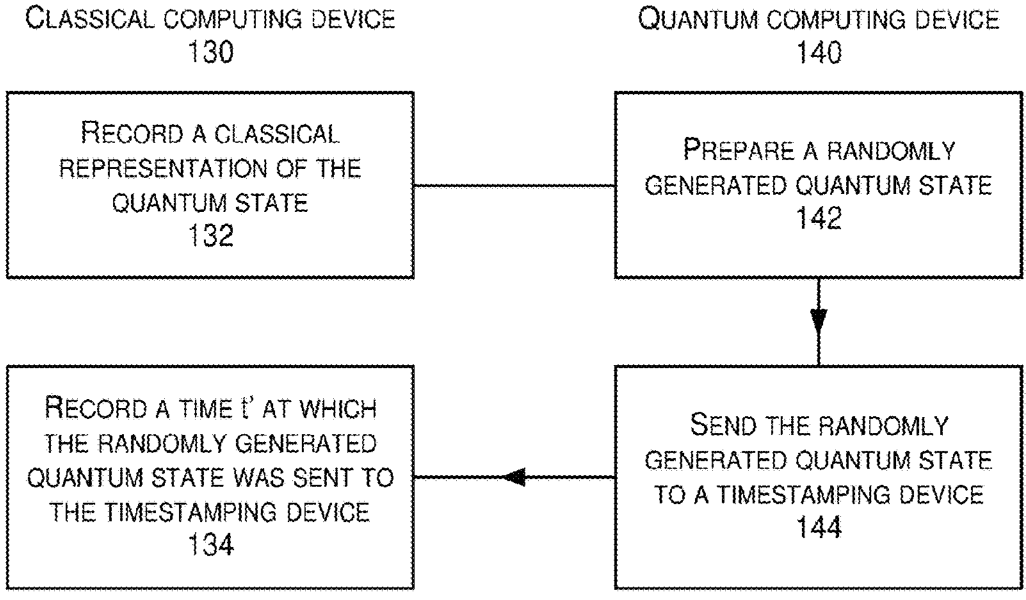

FIGS. 1*a* and 1*b* are flowcharts showing a method according to the present disclosure. FIG. 1*a* shows the method performed by the timestamping device which can otherwise be known as a time proving entity. FIG. 1*b* shows the method performed by the verifier which can otherwise be known as a verification entity.

The timestamping device/timestamping entity comprises a classical computing device 110 and a quantum computing device 120. At step 112, the classical computing device 110 of the timestamping device obtains an item to be timestamped. The item to be timestamped can be a transaction, a file, a photo, a predetermined value or null item/file or any other suitable item. The item to be timestamped can be obtained by being generated by the timestamping device, by being received from a third party, by being obtained from storage on the timestamping device or in any other suitable way.

Once the item to be timestamped has been received, the method comprises determining an input token based on the obtained item in step 114. The input token is a classical bit valued token derived from the item to be timestamped. The input token can be derived in any suitable way. However, in one example, the input token can be calculated using a hash function. In some examples the input token uses all of the bits obtained by applying a hash function to the item to be timestamped. However, in other examples, the results of the hash function are truncated to form the input token. The input token can then be used along with a randomly generated quantum state during timestamping.

At step 122, the quantum computing device of the timestamping device or timestamping entity receives a randomly generated quantum state from a verifier/time proving entity. The randomly generated quantum state is received at a time, t. The randomly generated quantum state may be encoded in a plurality of qubits or a plurality of qudits. The randomly generated quantum state may be received as a stream of qubits/qudits over time or all of the qubits/qudits may be received in parallel by, for example, using optical qubits/qudits with different wavelengths or receiving the qubits/qudits on spatially separated paths.

At step 124, the quantum computing device of the timestamping device performs quantum operations on the randomly generated quantum state wherein the quantum operations are related to/dependent on or otherwise determined by the input token. The quantum operations include at least measurement of the randomly generated quantum state wherein this measurement can occur after the randomly generated quantum state has been entangled with another quantum state and/or acted on by quantum gates. As explained in more detail with respect to FIGS. 2 and 3, the quantum operations can be related to the input token in multiple different ways.

In one example, the operations applied to the quantum state are related to the input token since the input token is used to determine the measurement bases for the quantum state. For example, the input token can be used to determine whether each qubit of the randomly generated quantum state should be measured in the computational/standard/Z-basis basis (e.g. the $|0\rangle$, $|1\rangle$ basis) or the rotated/X-basis (e.g. the $$|+\rangle = \frac{|0\rangle + |1\rangle}{2}, |-\rangle = \frac{|0\rangle - |1\rangle}{2}$$

basis). The skilled person would understand other pairs or groups of bases may be used for measurement as appropriate. The qubits/qudits of the randomly generated quantum state can then be measured as shown in step 126 according to the determined bases. This results in an output in the form of classical bit string that can be considered to be a timestamp proof token. When the input token is used to determine the measurement bases then both the timestamping device and the verifier may know the rules used to determine the measurement bases. To this end, in one example, the rules can be fixed or predetermined rules. In some instances, these rules might be to take a certain defined sequence of a whole or part of the input token, transform it using a function such as a cryptographic hash function, and translate the resultant token to a measurement basis sequence by taking it in groups of bits, and applying some mapping from groups of bits. This may be arranged so that the rules generate sufficient bases for the number of measurements that need to be made. Hash functions may help here also, because they can provide a fixed length output for any length of input string.

In another example, the input token can be used to determine a set of quantum operations that are applied to the qubits/qudits to form a resultant quantum state. In one example, the bit values of the input tokens may be mapped onto a set of quantum gates and that set of quantum gates applied to the randomly generated quantum state. For example, a trio of bit values may be used to determine a number between 7 and 0 where that number can be mapped onto a quantum gate from the set X, Y, Z, H, I, S, T and CNOT wherein $$X = \begin{pmatrix} 0 & 1 \\ 1 & 0 \end{pmatrix}, Y = \begin{pmatrix} 0 & -i \\ i & 0 \end{pmatrix}, Z = \begin{pmatrix} 1 & 0 \\ 0 & -1 \end{pmatrix}, H = \frac{1}{\sqrt{2}}\begin{pmatrix} 1 & 1 \\ 1 & -1 \end{pmatrix},$$

$$I = \begin{pmatrix} 1 & 0 \\ 0 & 1 \end{pmatrix}, S = \begin{pmatrix} 1 & 0 \\ 0 & i \end{pmatrix}, T = \begin{pmatrix} 1 & 0 \\ 0 & e^{i\pi/4} \end{pmatrix} \text{ and } CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix}.$$

Although X, Y, Z, H, I, S and T are single qubit gates, CNOT is a two-qubit gate. Therefore, if the input token requires a CNOT on a specific qubit the CNOT can be between that qubit and the qubit before or the qubit after dependent upon the specific implementation. This CNOT may be implemented, for example in integrated photonics, using an optical switch with a switch frequency at half the qubit transmission rate and a delay line between one of the outputs of the switch and the input to the two-qubit gate. Other sets of quantum gates could also be used. Other ways of mapping quantum gates onto bit value are also possible, for example two bits may be used to determine a selection of gates from X, Y, Z and H or another set of gates. For example, if it is predetermined according to the rules of the implementation, that the combination quantum circuit will have 2 input qubits and 2 output qubits, where each pair of input qubits is drawn one from the random quantum stream, then the selection of gates made according to the successive bit values of the quantum token may be placed from left to right and (where a 1 qubit gate is selected) alternating from top to bottom of the circuit. In other examples the input token may undergo preprocessing such as a hash function or other transform before it is used to determine the set of quantum gates. Once the randomly generated quantum state has been acted on by the set of quantum gates, the result can be measured, as shown in step 126, to obtain a classical bit string in the form of a timestamp proof token. In some examples, the resultant quantum state may be measured in a fixed basis, for example the computation basis or the rotated basis. However, in other examples the basis for each qubit/qudit of the resultant quantum state may be determined in the fashion discussed above. Both the timestamping device and verifier may be aware of the rules used to convert the input token to a set of quantum gates. This ensures the verifier can recreate the operations performed by the timestamping device. To this end, in one example, the rules can be fixed or predetermined rules.

In yet a further example, the operations are related to the input token in that the input token can be converted to a quantum state referred to as an input quantum state. For example, the classical computing device 110 of the timestamping device can determine a form of the input quantum state based on the input token. This may involve the classical computing device 110 determining a classical representation of the input quantum state. The quantum computing device 120 can then be used to prepare a quantum register in the input quantum state. In some examples, the input token may comprise a string of bit values. These bit values may then be used to form a quantum state having the same bit values in the computational basis or the rotated basis. Alternatively, the input token can be split into pairs of bit values. One bit from each pair can be used to determine a basis in which a qubit of the input quantum state should be prepared (e.g. whether the qubit should be prepared in the computational basis or the rotated basis) and the other bit from each pair can be used to determine the state prepared (e.g. when the computational basis is used whether the state is $|0\rangle$ or $|1\rangle$ or when the rotated basis is used whether the state is $|+\rangle$ or $|-\rangle$). The skilled person would understand other pairs or groups of bases may be used as appropriate. Performing quantum operations related to the input token then comprises performing entangling or other mixing quantum operations between the input quantum state and the randomly generated quantum state to generate a resultant quantum state. In some examples, the quantum operations performed are fixed. In other examples, a first part of the input token may be used to determine the input quantum state and a second part of the input token may be used to determine the quantum gates performed. For example, the second part of the input token may be used to determine whether bits of the input quantum state and randomly generated quantum state should be entangled using a Controlled Not gate, $$CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix},$$

or a Controlled Phase gate, CZ gate, $$CZ = \begin{pmatrix} 1 & 0 & 0 & 0 \\ 0 & 1 & 0 & 0 \\ 0 & 0 & 1 & 0 \\ 0 & 0 & 0 & -1 \end{pmatrix}$$

by mapping the gates onto the bit values of the second part of the input token. While the above has been described with respect to entangling gates, other ways of mixing the input quantum state and randomly generated quantum state are possible, for example using operations based on quantum discord wherein quantum discord describes non-classical correlations between e.g. qubits that violate Bell's Inequalities but not necessarily to the same degree as quantum entanglement. Both the timestamping device and the verifier may know any rules used to determine the input quantum gates from the input token. This ensures the verifier can recreate any operations performed by the timestamping device. To this end, in one example, the rules can be fixed or predetermined rules. Once the resultant quantum state has been obtained it is measured, as shown in step 126, to obtain a classical bit string in the form of a timestamp proof token. In some examples, the resultant quantum state may be measured in a fixed basis, for example the computation basis or the rotated basis. However, in other examples the basis for each qubit/qudit of the resultant quantum state may be determined in the fashion discussed above based on a second/third part of the input token.

As discussed above, the quantum operations can be performed such that the quantum operations are related to the input token in multiple different ways. For example, the input token can be used to determine a measurement basis, the operations performed, or used to form an input quantum state which is then entangled (or otherwise mixed via non-classical correlations) with the randomly generated quantum state. While each of the above options can be used separately, they can also be used in combination. Therefore, the input token can be split into multiple parts and different parts of the input token used for different purposes. For example, a first part of the input token could be used to determine a set of measurement bases and a second part a set of operations; or a first part could be used to determine a set of measurement bases and a second part used to form an input quantum state that is interacted with the randomly generated quantum state. In another example a first part of the input token can be used to determine a set of operations and a second part an input quantum state that the randomly generated quantum state will be made to interact with. In this example, the set of operations determined by the first part of the input tokens may comprise a series of entangling gates that will be used to entangle the input quantum state and the randomly generated quantum state. Alternatively, the set of operations may comprise a series of quantum gates performed on the randomly generated quantum state, the input quantum state or the result of the interaction of the two either before or after the mixing/entangling operation. In further examples, the input token may comprise at least three parts with a first part being used to determine a set of measurement bases, a second part used to determine a sequence of quantum operations and a third part an input quantum state. As such, all the examples above may be combined in one implementation of the application.

In step 224, the classical computing device 110 of the timestamping device obtains the results of the measurement of the quantum state in step 126. This is then used as a timestamp proof token associated with the time t at which the quantum computing device 120 of the timestamping device received the randomly generated quantum state. The classical computing device 110 of the timestamping device can store the timestamp proof token along with the item to be timestamped and the time t associated with the timestamp. The timestamp proof token can then be used to verify the timestamp as discussed later.

The above method provides a way for a device to timestamp its own items in a way that is difficult to forge. This means the item to be timestamped does not need to be sent to a third party before the item is timestamped. This enables the item to be timestamped to be kept secret before it is timestamped. In terms of difficulty to forge, given the no-cloning theorem, the timestamping device is unable to clone the received randomly generated quantum state and use it for timestamping multiple transactions. In addition, given it is not possible to measure a quantum state and obtain all the information about that state, the timestamping device would be unable to use classical simulation to predict the outcome of operations (since it would not have an accurate input in the form of a representation of the randomly generated quantum state). Furthermore, the difficulty in forming accurate and reliable long term quantum memories would make it hard for the timestamping device to store the quantum state long term. Other methods of ensuring security in the presence of a memory are discussed below.

FIG. **1*b* shows the method performed by the verifier/verification entity. The verifier/verification entity comprises a classical computing device 130 and a quantum computing device 140. The verifier/verification entity may be a secure device. For example, the classical computing device 130** of the verifier/verification entity may be a secure device that stores information securely e.g. through the use of cryptography or any other security protocol to ensure no third part (or the timestamping device) can access the information.

At step 142 the quantum computing device 140 of the verifier generates the randomly generated quantum state and sends it to the timestamping device. The randomly generated quantum state can be generated in any known way. For example, the randomly generated quantum state can be generated by having the classical computing device 130 randomly/pseudo-randomly choose a basis and a state for each qubit/qudit of the randomly generated quantum state. The method then comprises using the quantum computing device 140 to prepare a quantum register or other collection of qubits/qudits into the chosen bases and states. For example, when qubits are used, the classical computing device 130 may randomly (or pseudorandomly) choose whether each qubit of the randomly generated quantum state should be prepared in the computational or rotated basis. If the computational basis is chosen for a particular qubit, then the classical computing device 130 randomly (or pseudo-randomly) chooses whether to prepare the qubit in the state in the state $|0\rangle$ or $|1\rangle$. In contrast, if the rotated basis is chosen for a particular qubit, then the classical computing device 130 randomly (or pseudorandomly) chooses whether to prepare the qubit in the state $|+\rangle$ or $|-\rangle$. Other pairs or groups of bases may also be used. In addition when qudits are used each basis may comprise more than two states. The classical computing device 130 may use a classical random or pseudorandom number generator or another random/pseudorandom process to determine the basis and/or state. Alternatively the classical computing device 130 may interface with a quantum random number generator (which may form part of quantum computing device 140) to generate random numbers to determine the basis/state for each qubit. When the randomly generated quantum state is being prepared in the form of photonic qubits then preparing the randomly generated quantum state may comprise using a single photon source or a laser/attenuator to generate the qubits and polarisation control to ensure the qubits are in the correct state.

In step 132 a classical representation of the randomly generated quantum state is recorded/stored at classical computing device 130. This classical representation may be a record/log or other register of the basis and state used for preparing each qubit/qudit. Therefore, the classical representation may be used in the process of generating the randomly generated quantum state. Given the randomly generated quantum state is to be used, it is noted this classical representation is not a direct measurement of the randomly generated quantum state. However, in some examples, an entangled pair of photons is generated at the quantum computing device 140 of the verifier, and one of the pair is sent to the quantum computing device 120 of the time stamping device. The other is measured by the quantum computing device 140 of the verifier, and its value is recorded. In this way the verifier gains information on the randomly generated quantum state of the entangled photon that was sent to the timestamping device which can be used as the classical representation. The classical representation may be stored in multiple forms including a list of basis and states, a set of matrices for each qubit/qudit, a matrix representing all qubits/qudits in the quantum state, a representation of the quantum state in Dirac notation etc. In some implementations, to save storage space at the classical computing device 130 of the verifier and when the classical representation is used in the process of generating the randomly quantum state, the classical representation may comprise a sequence of values/a bit string. This sequence of values/bit string may be generated using a deterministic function pseudorandom number generator. This enables the values to be regenerated by the classical computing device 130 of the verifier as long as it stores the seed and the function (both of which should be kept secret.) Recording/storing a classical representation of the randomly generated quantum state can therefore comprise storing the seed and the function.

In step 144, the quantum computing device 140 sends the randomly generated quantum state to the timestamping device using a quantum channel. The quantum channel may be an optical fibre or free space (e.g. air) although dependent upon the form of qubits/qudits other forms of quantum channels may be used. The quantum computing device 140, sends the randomly generated quantum state to the timestamping device at a time t' wherein $t'=t-t_t$ wherein $t_t$ is the time it takes the randomly generated quantum state to be transported between the verifier and the timestamping device. The time taken to transport the quantum state though the quantum channel between the verifier and the timestamping device, $t_t$ can be determined based on distance between the verifier and the timestamping device and/or by using a calibration process.

In some examples, the quantum state may be sent as a steam of qubits/qudits where the steam of qubits/qudits are separated over time. In other examples the qubits/qudits could be sent in parallel. For example, the qubits/qudits could be optical qubits/qudits and could be sent in parallel by having each qubit/qudit have a different wavelength or be sent through spatially separated channels. In order to send the qubits/qudits in parallel the qubits/qudits can be stacked into different channels, for example, by preparing the state using an array of Mach-Zehnder (MZ) modulators in front of an array of single photon emitters each with a different emission wavelength. Alternatively, the qubits/qudits can be sent in parallel using spatially separated quantum channels for example, in the case of photonic qubits/qudits, by using multicore fibres or quantum channels offset in free space. Depending on the form of qubit/qudit and channel other ways of sending the qubits/qudits in parallel may also be possible.

In step 134, the classical computing device 130 of the verifier records/stores the time the randomly generated quantum state was transmitted in association with the recordal/storage of the classical representation of the randomly generated quantum state. This ensures there is a record of the time the randomly generated quantum state was sent to the timestamping device.

The method performed by the verifier/verification entity/time proving entity provides the timestamping device with a randomly generated quantum state at a known time. This allows the timestamping device to use the randomly generated quantum state to form a timestamp.

Figure 1C:
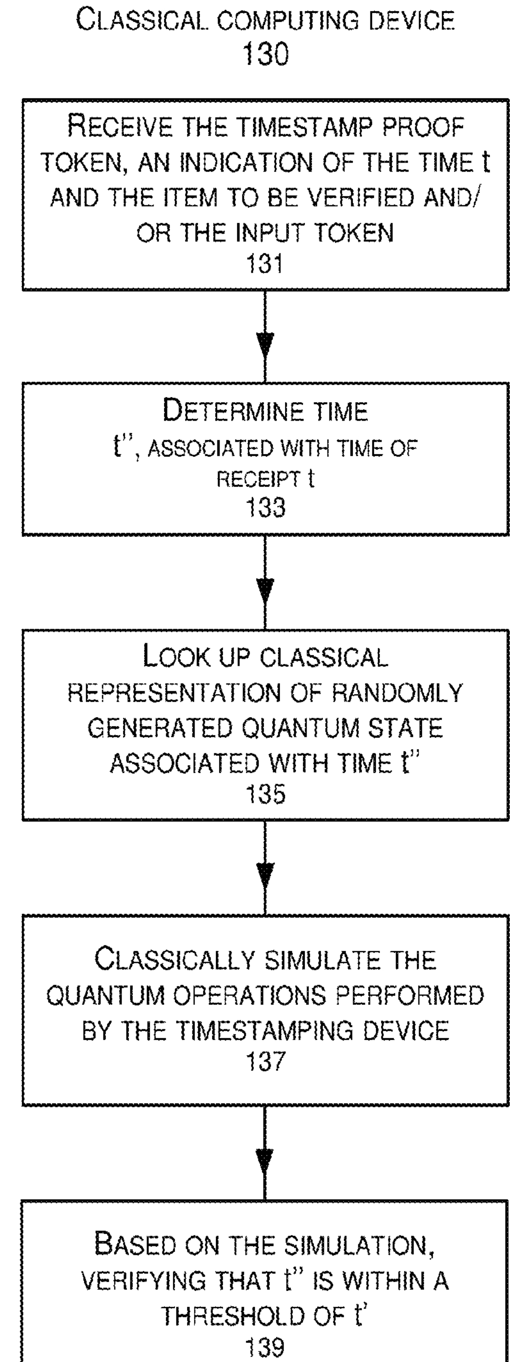

The verifier/verification entity/time proving entity can be used to verify a timestamp from the timestamping device as shown in FIG. 1*c*. In this regard, the timestamping device will provide a copy of the timestamp proof token associated with the time t, an indication of the time t and either a copy of the item to be verified (e.g. the item to be timestamped) and/or a copy of the input token. In some examples, the timestamping device may be requesting authentication itself, in which case it can provide the timestamp proof token, the indication of the time, t, and either the copy of the of the item to be verified and/or the input token directly to the verifier. In other examples a third party may be seeking verification of the timestamp so may be the one to provide the information to the verifier. In some examples the information provided by the timestamping device can be authenticated using standard classical techniques such as digital signatures generated using a classical private key held by the timestamping device and which may be verified against a PKI (public key infrastructure) certificate authority.

In either case, the information is received by the classical computing device 130 of the verifier at step 131.

At step 133, the classical computing device 130 of the verifier determines a time t" associated with the time t. As discussed above, the randomly generated quantum state may take a time $t_r$ to be transported through the quantum channel. This time may be known based on the distance between the verifier and the timestamping device. In some cases the time $t_r$ is found empirically via an initial calibration process (referred to as a link-latency calibration), which is optionally repeated on an ongoing basis to correct for innocent channel variation. In some cases, the repetition of the calibration is done at random intervals so as to catch fraudulent movement of the timestamping device closer to the verifier, without having to add another verifier. Thus to thwart attempts at fraudulent movement of a timestamping device closer to a verifier after initial link-latency calibration, some examples randomly repeat the link-latency calibration. The classical computing device 130 of the verifier may determine the time t" at which the randomly generated quantum state was sent based on the time, t, at which the randomly generated quantum state was received by subtracting the time taken for transport from the time, t for example $t''=t-t_r$.

At step 135, the classical computing device 130 of the verifier, looks up a classical representation of the randomly generated quantum state associated with time t". As mentioned above, in step 132 and 134 a classical representation of the randomly generated quantum state is stored in association with a recordal of the time t'. At step 135, the classical computing device 130 of the verifier can consult this stored information to determine a classical representation of the randomly generated quantum state associated with the time t.

At step 137, the classical computing device 130 of the verifier uses the found classical representation of the randomly generated quantum state and the item to be verified/input token to simulate the operations performed by the quantum computing device 120 of the timestamping device when performing timestamping. If the item to be verified is provided, this step may first involve obtaining the input token from the item to be verified in the same fashion as the classical computing device 110 of the timestamping device. For example, this can involve applying the same hash function to the item to be verified. Given the timestamping follows a fixed protocol both the verifier and the timestamping device will be aware of the operations, e.g. the hash, performed by the classical computing device 110 to obtain the input token. Therefore, the classical computing device 130 of the verifier can recreate these operations. If both the item to be verified and the input token were provided, the verifier may verify the input token provided matches the input token it obtains from repeating the operations. As mentioned in more detail below, in some examples the calculation of the input token (or the input token itself) may incorporate a previous timestamp proof token. If this is the case, then the classical computing device 130 of the verifier may also be provided with this timestamp proof token. In some examples, the classical computing device 130 of the verifier may check the validity of the previous timestamp proof token or even all previous timestamp proof tokens using the relevant times, t and items to be timestamped. This provides a more detailed level of verification that ensures the timestamping device cannot store randomly generated quantum states.

Once the classical computing device 130 has the input token and a classical representation of the randomly generated quantum state, then at step 137, it performs a classical simulation of the quantum operations performed on the randomly generated quantum state. The timestamping device and the verifier will have pre-agreed or otherwise fixed a method, such as those described above, for performing quantum operations on the randomly generated quantum state such that at least some of the operations are related to the input token. The classical computing device 130 of the verifier can therefore perform a classical simulation of the operations performed by the quantum computing device 120 of the timestamping device. It is noted that the classical computing device 130 of the verifier is able to perform a classical simulation when the classical computing device 110 of the timestamping device is not because the classical computing device 130 of the verifier has access to the classical representation of the randomly generated quantum state and so knows all the inputs to the quantum computing device 120 of the timestamping device. As discussed above, the classical computing device 110 of the timestamping device did not have access to this classical representation of the randomly generated quantum state and would not be able to obtain such a classical representation from the randomly generated quantum state since it is only provided with one (or very few) copies of the randomly generated quantum state. The result of the classical simulation may be a state vector in the basis corresponding to the chosen measurement basis. This state vector gives the probabilities of outcomes at each detector of the quantum computing device 120 of the timestamping device used to perform the measurement. The probabilities are the square of the amplitude of the state vector, when it is expressed in the measurement basis, wherein each row corresponds to a given detector. Alternatively, if a different basis is used, as is well known to those skilled in the art, it may be calculated as the square the inner product (bra-ket) projection between the state vector and the basis corresponding to the detector, expressed in the different basis. If the probability of a detection of a particular state is zero according to the state vector, but a detection of that state is measured, then a non-compliance may be recorded for that part of the proof token.

At step 139, the classical computing device 130 of the verifier verifies that time t" matches time t', for example, that t" is within a threshold of time t'. Thus, the classical computing device 130 can determine whether the provided timestamp proof token is a likely output of the quantum operations related to the input token being performed on the randomly generated quantum state. This can be done for example by comparing the values from the classical simulation with the values from the timestamp proof token and checking the compatibility of measurement values in the timestamp proof token with the measurements that would have been performed on the randomly generated quantum state. The classical computing device 130 of the verifier can calculate a percentage of non-compliant measurements (e.g. measurement values in the timestamp proof token that could not have been obtained from performing the quantum operations on the randomly generated quantum state) as a fraction of all measurements. In addition or as an alternative the classical computing device 130 of the verifier can calculate the probability of obtaining the measurement values in the timestamp proof token given the declared or derived input token. The classical computing device 130 of the verifier may reject the timestamp proof token if the probability of obtaining the measurement values in the timestamp proof token is below a threshold and/or the percentage of non-compliant measurements is above a threshold. The threshold for non-compliant measurements and/or probability of obtaining the measurement values can reflect an upper limit of expected and tolerated noise on the channel. If the timestamp proof token is a likely output, then the verifier can confirm/validate/verify the timestamp proof token. In contrast, if the timestamp proof token is not a likely output, then the verifier can fail to confirm/validate/verify the timestamp proof token.

The above method provides a way for a verifier to verify the timestamp proof token. In some examples the verifier uses the item to be timestamped. However, in other examples, the verifier only needs the input token, so it is possible to verify the timestamp without the verifier ever receiving the item to be timestamped. This enables more secure secret timestamping. For example, the timestamping device may wish to prove the timestamp to a third party. The timestamping device may provide the third party with the time, t, the timestamp proof token and the item to be timestamped. The third party may determine the input token from the item to be timestamped then forward the input token, time t, and timestamp proof token to the verifier. The third party can therefore verify the timestamp fully without having to share the item to be timestamped with the verifier.

Figure 2:
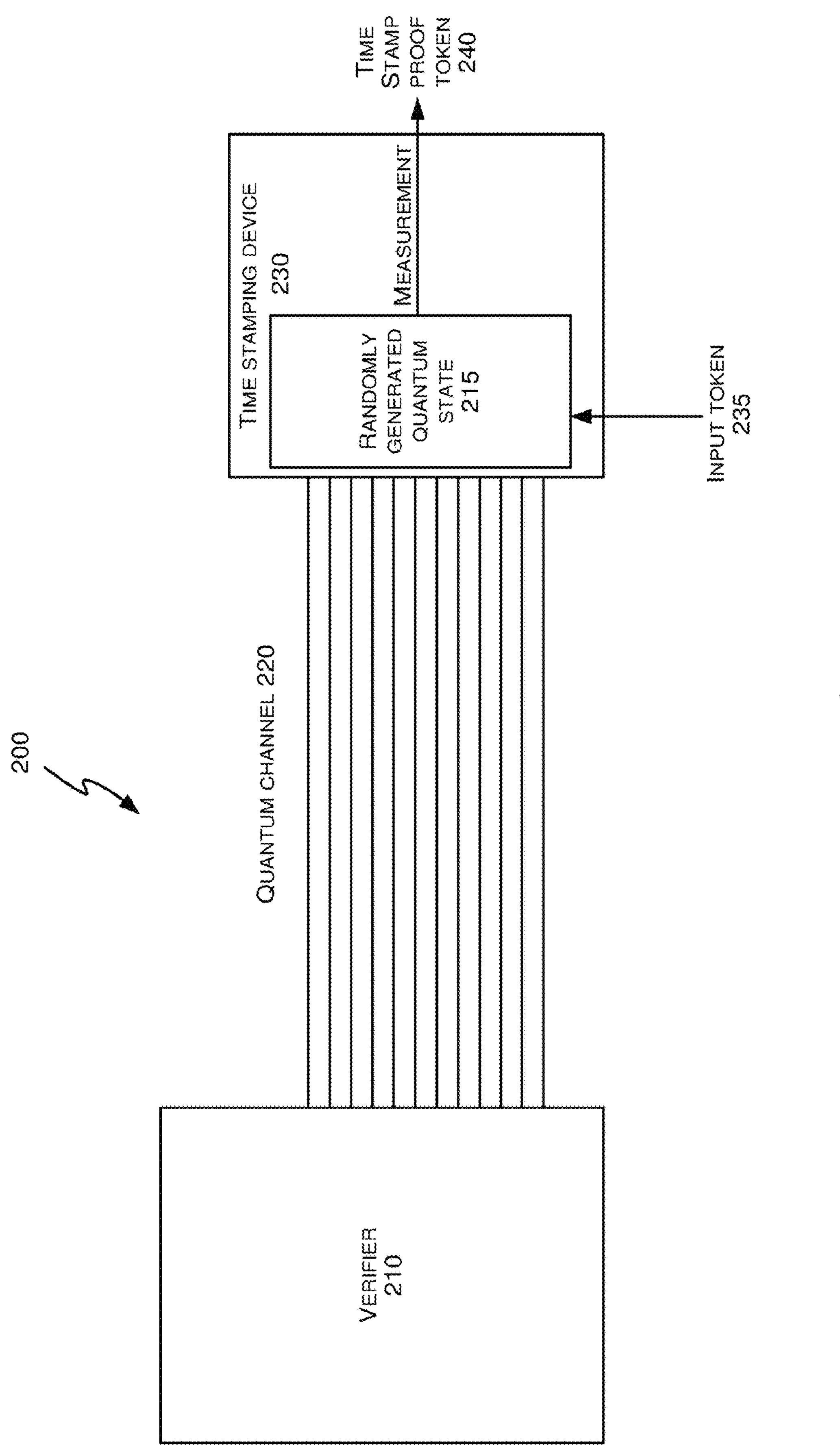
FIG. 2 shows an example system for timestamping using operations dependent upon an input token.

FIG. 2 shows a system 200 comprising a verifier 210 and a timestamping device 230 connected via a quantum channel 220. In a non-limiting example, the timestamping device 230 is a user device and the verifier 210 is a central device/server taking a role similar to current timestamping servers. As discussed above, the verifier 210 generates a randomly generated quantum state 215 and sends it via quantum channel 220 to timestamping device 230. A quantum computing device of the timestamping device receives the randomly generated quantum state at a time, t. A classical computing device of the timestamping device 230 generates an input token 235 from the item to be verified. The quantum computing device of the timestamping device 230 performs quantum operations on the randomly generated quantum state 215 wherein at least one of the quantum operations are related to the input token 235. In the example shown in FIG. 2, the quantum operations performed on the randomly generated quantum state 215 are related to the input token 235 in that the input token 235 is used to determine at least some of the quantum operations. For example, as described above a set of quantum gates may be applied to the randomly generated quantum state 215 wherein the set of quantum gates is chosen based on the input token 235. In addition or as an alternative the bases in which the randomly generated quantum state 215 will be measured are determined based on the input token 235. For example, the bit value of the input token can be used to determine whether measurement will be performed in the computation or rotated basis. As mentioned above, in some examples a first part of the input token 235 may be used to determine a sequence of quantum operations and a second part of the input token 235 may be used to determine the bases for the measurements. After any (non-measurement) quantum operations are applied to the randomly generated quantum state 215, the randomly generated quantum state 215 is measured. As described above, in some examples the basis for the measurement of each qubit/qudit of the randomly generated quantum state may be determined based on the input token. In other examples the basis of the measurement of each qubit/qudit is fixed. The classical result of the measurement of the randomly generated quantum state is a classical bit string which can be considered to be a timestamp proof token 240 which can then be stored in association with the time t and the item to be verified to act as proof of the timestamp. Any rules for determining the bases and quantum operations can be fixed/pre-agreed or otherwise predetermined such that both the timestamping device 230 and the verifier 210 know the rules that will be used.

Figure 3:
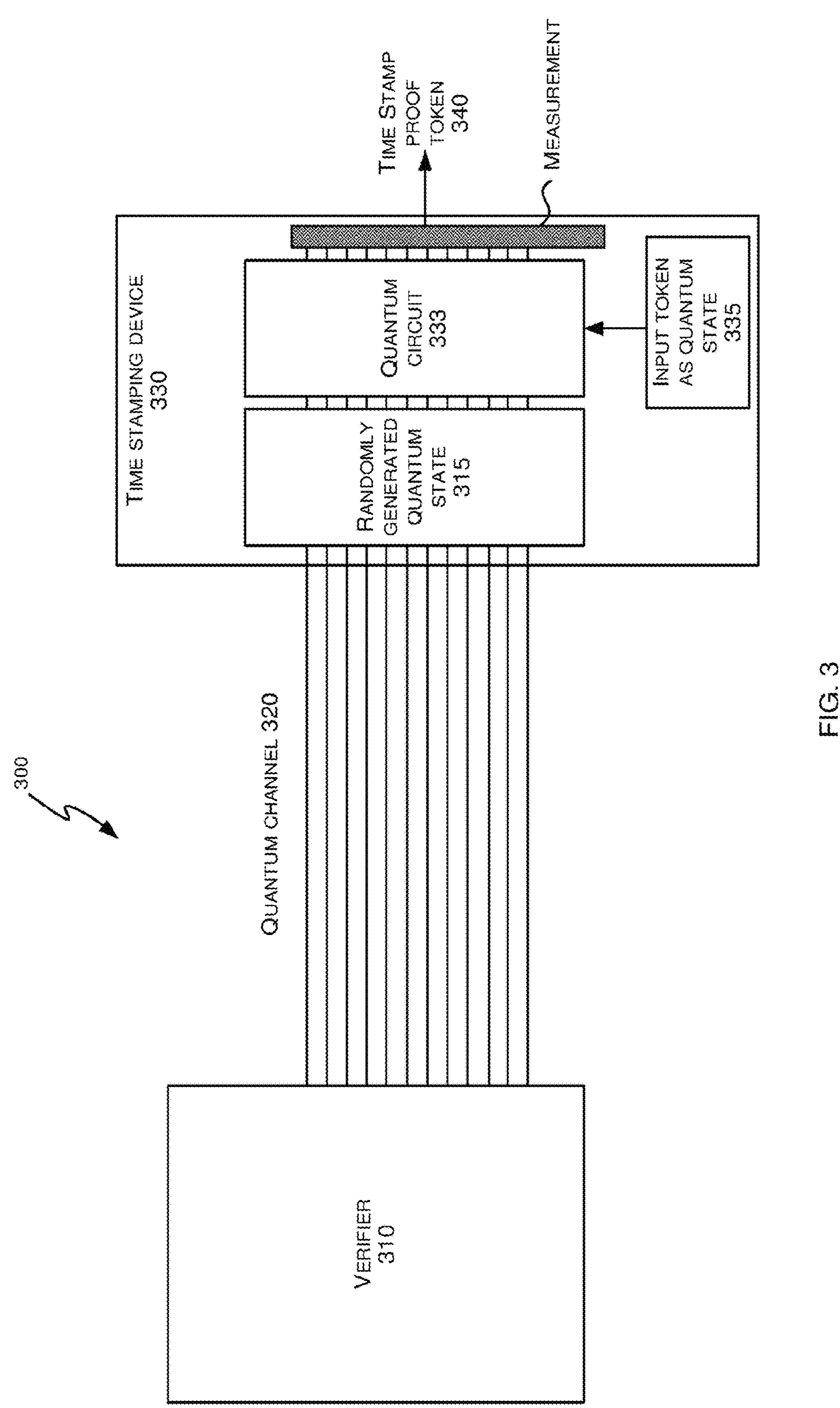
FIG. 3 shows an example system for timestamping using an input token as an input quantum state.

FIG. 3 shows a system 300 comprising a verifier 310 and a timestamping device 330 connected via a quantum channel 320. The verifier 310 generates a randomly generated quantum state 315 and sends it to the timestamping device 330. A quantum computer of the timestamping device 330 receives the randomly generated quantum state at time, t. A classical computer of the timestamping device 330 obtains an input token from the item to be timestamped. This input token is then prepared as an input quantum state 335. This can be done in a manner that is fixed/pre-arranged or otherwise predetermined such that it is known by both the timestamping device 330 and the verifier 310. A quantum circuit 333 performs quantum operations on the randomly generated quantum state 315 such that at least some of the quantum operations are related to the input token by having the quantum circuit 333 act on the randomly generated quantum state 315 and the input quantum state 335 and mix them, e.g. through the use of entangling gates (such as the CNOT or Controlled-Phase gate) or via other non-classical correlations. In some examples, the operations performed can be a known fixed set of operations known to both the verifier 310 and the timestamping device 330. In other examples, the set of operations may be determined based on a part of the input token in a manner known to both the verifier 310 and timestamping device 330. After implementation of the quantum circuit 333, the resultant quantum state is measured. The bases for the measurement can either be predetermined and known to both the verifier 310 and the time stamping device 330 or determined based on a portion of the input token in a manner known to both the verifier 330 and the timestamping device 330. The measurement results in a classical bit string which can be stored as a timestamp proof token alone with the item to be timestamped and an indication of the time t.

As mentioned above, in some examples the timestamp may be difficult to forge due to the difficulty in implementing quantum memories. When the timestamping device does not have access to a quantum memory, the randomly generated quantum state will be used straight away ensuring the timestamp reflects the time at which the quantum state was received. However, the above methods can also be adapted to ensure they work even in light of enhanced quantum memory.

In one example technique, the timestamping device 230, 330 may send at least the timestamp proof token 240, 340 and the input token 235, 335 and/or the item to be timestamped to the verifier 210, 310 within a threshold period of time after receipt of the randomly generated quantum state 215, 315. The verifier 210, 310 can then verify the timestamp proof token 240, 340 using a method such as that discussed above. In such examples the timestamping device 230, 330 may also provide an indication of the time, t associated with the timestamp proof token. However, if the verifier 210, 310 is verifying every randomly generated quantum state is used this may not be necessary since the verifier 210, 310 may be able to anticipate the time t based on the time/order of receipt of the timestamp proof token 240, 340 and the input token and/or the item to be stamped. The verifier may respond by providing a confirmation of receipt and/or an indication of the validity of the timestamp proof token 240, 340.

In another example, rather than having the timestamping device 230, 330 provide every timestamp proof token 240, 340, the verifier 210, 310 may at random intervals or time gaps request a timestamp proof token associated with a time t. In response to such a request, the timestamping device 230, 330 can provide the timestamp proof token associated with the time t along with the input token and/or the item to be timestamped. The verifier 210, 310 can then verify the timestamp proof token 240, 340 in the manner described above. In some examples the verifier may provide confirmation of receipt and/or an indication of the validity of the timestamp proof token 240, 340.

The above two techniques ensure that the randomly generated quantum states 215, 315 are being used by the timestamping device 230, 330 and prevent the timestamping device 230, 330 saving the randomly generated quantum state 215, 315 to use at a later time. In addition, the randomly generated quantum state 215, 315 cannot be cloned due to the no-cloning theorem and it is not possible to determine full details of the randomly generated quantum state 215, 315 via measurement. Therefore, the use of the randomly generated quantum state means the verifier 210, 310 can be reasonably certain the timestamping device 230, 330 no longer has access to that state for later use.

Further security can be provided by having each item to be timestamped dependent upon previous items to be timestamped. In this regard, at least a portion of a previous timestamp proof token 240, 340 may be incorporated into either the item to be timestamped or the input token. In one example either the entirety or a portion of the previous timestamp proof token 240, 340 may be added (for example by concatenation) to either the item to be timestamped or the input token before quantum operations related to the input token are applied to the randomly generated quantum state 215, 315. This may mean all previously sent randomly generated quantum states 215, 315 need to be used to generate a timestamp proof token 240, 340 to obtain the next timestamp proof token 240, 340. In one example, instead of using the previous timestamp proof token 240, 340 itself, a hash of the previous timestamp proof token 240, 340 may be used and this hash incorporated into the item to be timestamped or the input token. In another example, the timestamp proof tokens 240, 340 may be stored on a blockchain either in a hashed or un-hashed form. Incorporating a least a portion of the previous timestamp proof token 240, 340 into the item to be timestamped or the input token can then comprise incorporating the previous block of the blockchain into the item to be timestamped or the input token. This enables the verifier 210, 310 easy access to previous timestamp proof tokens 240, 340. By having the item to be timestamped or the input token dependent upon previous timestamp proof tokens 240, 340, the verifier 210, 310 can confirm all previous randomly generated quantum states 215, 315 have been used and none of have been stored to use at a time not corresponding to the time of receipt, t.

Figure 4:
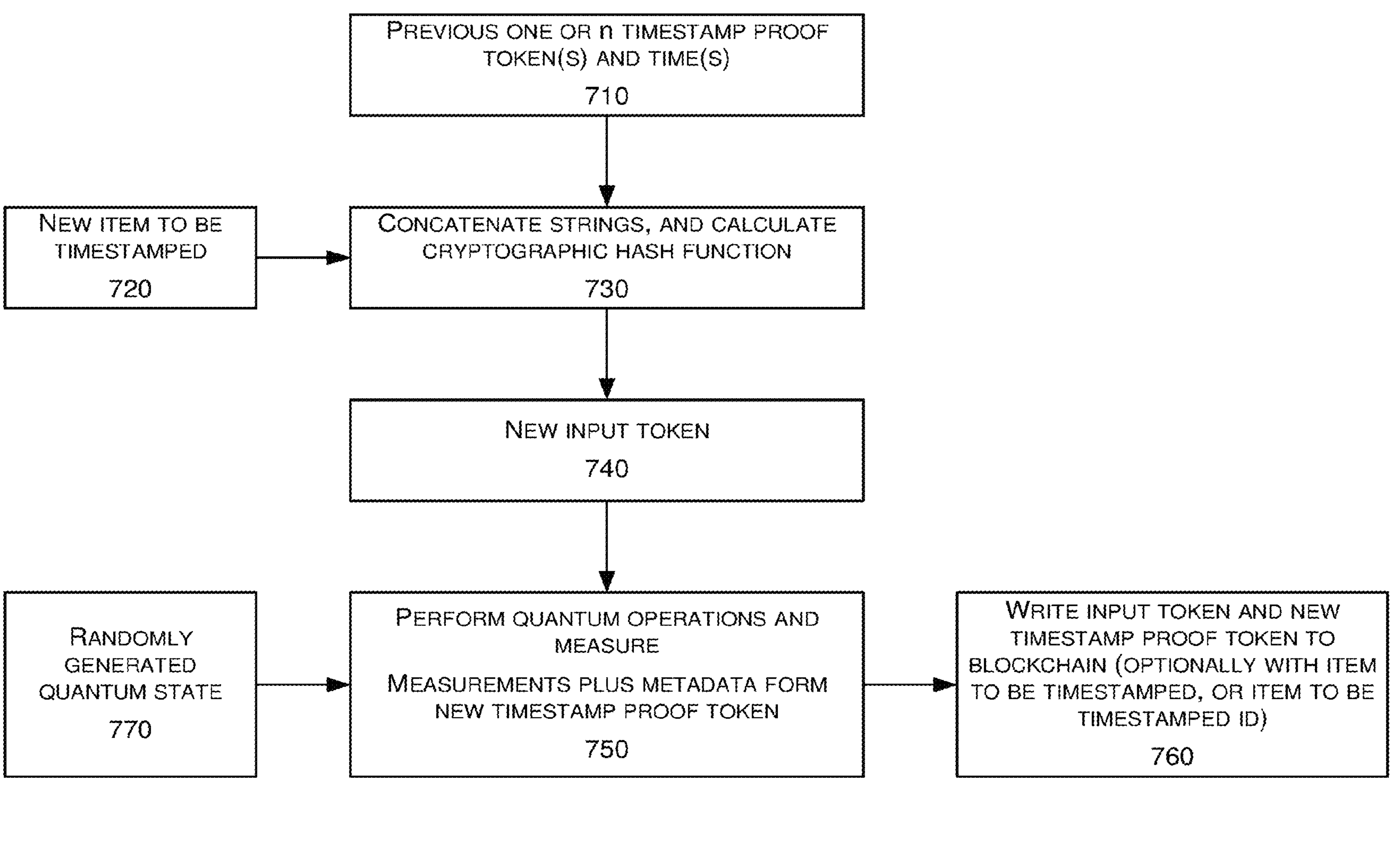
FIG. 4 shows a method of incorporating previous timestamp proof tokens into an input token.

An example of the above can be seen in FIG. 4. In box 710 the previous timestamp proof token and time, t, are provided as an input for forming the input token 235, 335. In some examples instead of just using the immediately previous timestamp proof token 240, 340 and time, t the previous n timestamp proof tokens 240, 340 and times, t can be used. In this example, n can be predetermined in the protocol. A new item to be timestamped is also provided as an input in box 720. In box 730, the previous timestamp proof token 240, 340 and time, t (or previous n timestamp proof tokens 240, 340 and times t) and the new item to be timestamped are concatenated and hashed using a cryptographic hash function. Both the concatenation and hash function can be fixed within the protocol. In box 740 this results in the new input token 235, 335 being formed. Box 750 receives this new input token 235, 335 as an input. In addition, box 750 receives the randomly generated quantum state 215, 315 as an input from box 770. Box 750 then performs the quantum operations including the measurements on the randomly generated quantum state 215, 315 wherein at least one of the operations is related to the input token 235, 335. This results in the timestamp proof token 240, 340. In some examples the timestamp proof token 240, 340 comprises the measurements. The timestamp proof token 240, 340 is then stored with metadata representing the previous timestamp proof token 240, 340 and time t (or previous n timestamp proof tokens 240, 340 and times t). In other examples, the timestamp proof token 240, 340 comprises the measurements combined with the metadata representing the previous timestamp proof token 240, 340 and time t (or previous n timestamp proof tokens 240, 340 and times t). In either case, in box 760, the input token 235, 335 and the timestamp proof token 240, 340 can be written to a blockchain along with the metadata where it is present. In some examples the item to be timestamped or an ID of the item to be timestamped may also be written to the blockchain along with the input token 235,335, the timestamp proof token 240, 340, and the metadata where it is present.

In the above examples, the timestamping device 230, 330 has to use each received randomly generated quantum state 215, 315. However, in some examples a timestamping device 230, 330 may not have an item to be timestamped each time a randomly generated quantum state 215, 315 is received. In such a case an item to be timestamped may not be obtained/received by time t. In such a case a predetermined value or bit string can be used as the input token, or a set/fixed/predetermined file or other document can be used as the null item to be timestamped. When a set file or document is used, this can be used to determine an input token as normal. The timestamping process can then be performed using the input token on the randomly generated quantum state 215, 315 as usual. This ensures that all randomly generated quantum states 215, 315 can be used even if there is no requirement for an item to be timestamped at the time of receipt of a randomly generated quantum state 215, 315. This further ensures that there is always a new recent timestamp proof token that can be incorporated into the calculation of the next input token.

As discussed above, the verifier 210, 310 estimates the time of receipt, t, of the randomly generated quantum state 215, 315 from the time, t', it sent the randomly generated quantum state 215, 315. This estimate can be performed based on the time taken to transmit the randomly generated quantum state 215, 315 through the quantum channel 220, 320. If the timestamping device 230, 330 moves closer to the verifier 210, 310 then the quantum state may be received earlier allowing a timestamp to appear to be for a later time than it actually is, similarly if the timestamping device 230, 330 moves further from the verifier 210, 310 then the quantum state may be received later allowing a timestamp to appear to be for an earlier time than it actually is. One way to overcome this would be to have the timestamping device 230, 330 receive multiple randomly generated quantum states from multiple sources of the verifier 210, 310 wherein the multiple sources are spatially distributed around the timestamping device 230, 330. In one example two sources can be used each providing a randomly generated quantum state 215, 315. The two sources can be distributed so that if the timestamping device 230, 330 moves closer to one source it moves further from the other source. In another example three sources are used each providing a randomly generated quantum state 215, 315, these sources can be distributed so moving closer to one of the sources means the timestamping device 230, 330 moves further from at least one of the other sources. All the randomly generated quantum states 215, 315 can then be used for timestamping. In one example, the three quantum states 215, 315 may be entangled or otherwise mixed via non-classical correlations before performing operations related to the input token. In other examples the randomly generated quantum states 215, 315 can be mixed with swap operations or joined to form a quantum state that is then acted on by the quantum operations related to the input token. In further examples, the quantum operations related to the input token themselves define how the randomly generated quantum states are combined with the input token defining any joining operations. In all cases, multiple randomly generated quantum states can be used as an input and the verifier 210, 310 can be aware of all the randomly generated quantum states associated with a time t. This ensures the verifier 210, 310 can confirm the timestamping device 210, 310 has not moved in order to fake a timestamp associated with the time t.

In the examples described above, the verifier 210, 310 provides the timestamping device 230, 330 with a randomly generated quantum state 215, 315 through a quantum channel 220, 320. The systems may also have the verifier 210, 310 provide the timestamping device 230, 330 with a classical clock signal in addition to the randomly generated quantum state 215, 315. This clock signal may be sent via a secure classical channel. This ensures the verifier 210, 310 and the timestamping device 230, 330 have a common clock and means the timestamping device 230, 330 provides a correct indication of the time t. Methods for establishing a common clock between a source and a receiver for the measurements of qubits, and the identification of which qubit has been received and corresponds to a given time bin, are well known from, for example, the field of quantum key distribution. In addition if the quantum state 215, 315 is received over a time period, for example, in the form of several qubits/qudits received in several time bins, the secure shared clock signal means the verifier 210, 310 and timestamping device 230, 330 can verify all the time bins. When the quantum state 215, 315 is received over a time period then the time t can be the end of the time period or be multiple times/time bins that reflect a time at which each part of the quantum state (e.g. each qubit or qudit) was received. This can allow the verifier 210, 310 to work out which qubits/qudits were used by the timestamping device 230, 330 as part of the randomly generated quantum state 215, 315. The randomly generated quantum state 215, 315 may thus comprise a set of qubits/qudits sent from the verifier 210, 310 and the verifier 210, 310 may not know which qubits/qudits formed the randomly generated quantum state 215, 315 until it receives the time bins for the qubits/qudits from the time stamping device 230, 330. The classical representation of the randomly generated quantum state may comprise a classical representation of each qubit/qudit that are then combined to form the complete classical representation. In other examples, the verifier 210, 310 may send a set of qubits/qudits in multiple time bins and work on the assumption they are all received by the timestamping device 230, 330. In this case, in some examples, only a time associated with the last received qubit/qudit is used as the time t for the time of receipt of the randomly generated quantum state 215, 315. In further examples the qubits/qudits forming the quantum state may be sent at a single time and the time t may reflect the time at which all qubits/qudits were received by the timestamping device 230, 330.

In the examples described above, the verifier 210, 310 and the timestamping device 230, 330 may verify each other before any communication. For example, the verifier 210, 310 and timestamping device 230, 330 may use a classical channel to perform a standard classical verification procedure such as a classical handshake. In addition or as an alternative the verifier 210, 310 and the timestamping device 230, 330 may use a quantum channel to perform a quantum verification procedure before they start communicating.

When photonic qubits are used, creating the timeproof token 240, 240 may use one or more measurement cycles, in which randomly generated quantum states 215, 315 from the verifier 210, 310 are combined with information from the input token 235, 335, and the resultant quantum state is measured (sometimes in a fixed basis, and sometimes according to values derived from the input token), and these measurements are stored in the timestamp proof token 240, 340 using a fixed or structured format so that each measurement value can be associated with a given time bin and a detector or channel. However, due to loss on the (photonic) quantum channel 220, 320, not all inputs from the verifier 210, 310 will normally arrive at the time stamping device 230, 330. This means that the quantum state being measured will not have included input from the lost photons of the randomly generated quantum state 215, 315 and the effect of this is that not all detectors of the quantum computing device 120 of the timestamping device 230, 330 will trigger when performing the measurement 126. This means a lower number of detections will be made in each measurement cycle than if photons were not lost, for example one detection instead of two. There are several ways to deal with this loss.

In one example, the loss can be dealt with by discarding measurement cycles in which an insufficient number of measurements are recorded. This is suitable for implementations in which loss is low. In this example, the discarded measurement cycles are recorded within the timestamp proof token 240, 340 obtained in that cycle.

In another example, the loss can be dealt with by replacing non-measurements with null values. When no measurement of a qubit/qudit is obtained during measurement phase 126, a null value may simply be recorded in the timestamp proof token 240, 340 in the place where the measurement value would normally be positioned. When verifying, it is understood by the classical computing device 130 of the verifier 210, 310 that null measurements are measurement cycles which cannot be fully verified. However, if there are partial measurements available in a timestamp proof token 240, 340 during a measurement cycle it is still possible to verify their compatibility with the input token 235, 335.

In a further example it is possible to establish whether or not the photon carrying the random qubit/qudit has arrived without disturbing the quantum information held within it. For example, the quantum channel 220, 320 may comprise several separate channels (spatial or frequency channels) through which qubits/qudits are sent from the verifier 210, 310. A quantum non-demolition (QND) measurement is used on each channel in each time bin, and an optical switch is used to direct a photon that has successfully arrived to be used by the quantum computing device 120 of the timestamping device 230, 330 as part of the randomly generated quantum state 215, 315. The channel used to obtain the photon is recorded by the classical computing device 110 of the timestamping device 230, 330 as metadata associated with the timestamp proof token 240, 340. Both the metadata and the timestamp proof token 240, 340 are provided to the verifier 210, 310, so that it can be later identified which qubit/qudit from the input (random) stream was used to create this part of the randomly generated quantum state 215, 315 and hence the timestamp proof token 240, 340. In some examples rather than being stored with the timestamp proof token 240, 340, the metadata is incorporated into the timestamp proof token 240, 340.

Figure 5:
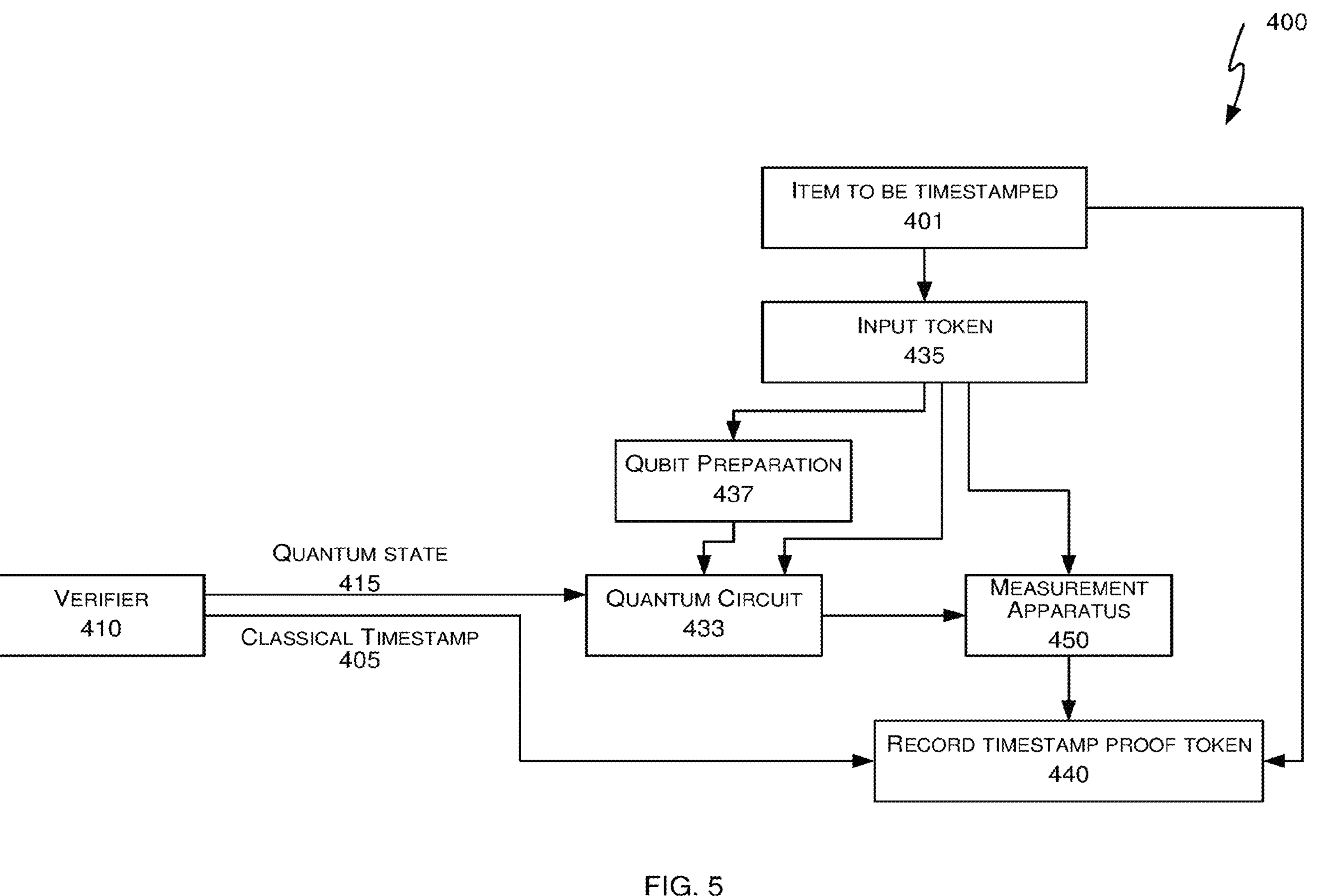
FIG. 5 shows a flowchart of a timestamping process.

Turning now to FIG. 5 a flowchart outlining a specific method 400 according to the present disclosure is described. A verifier 410 generates a classical timestamp 405 and randomly generated quantum state 415 and sends both of them to a timestamping device. The timestamping device obtains an item to be timestamped 401 and uses this to obtain an input token 435. A first part of the input token is then used to prepare a set of qubits in an input quantum state 437. A second part of the input token is used to determine a quantum circuit 433 to act on the randomly generated quantum state 415 and the input quantum state. A third part of the input token 435 is used to set the bases for measuring 450 the output of quantum circuit 433. When the randomly generated quantum state 415 is received the quantum circuit 433 acts on the randomly generated quantum state and the qubits from qubit preparation 437, for example by either entangling or otherwise mixing (e.g. via swap operations) the qubits from the two quantum states. The output of the quantum circuit is acted on by measurement apparatus 450 which measures the qubits in the bases determined by the third part of the input token 435. This results in a classical output in the form of a timestamp proof token. In box 440 the timestamp proof token is recorded along with the classical timestamp 405 which provides an indication of the time, t, corresponding to the timestamp and the item to be timestamped 401. Thus FIG. 5 outlines a method of timestamping at a timestamping device wherein the input token 435 is used in all the ways described above.

Figure 6A:
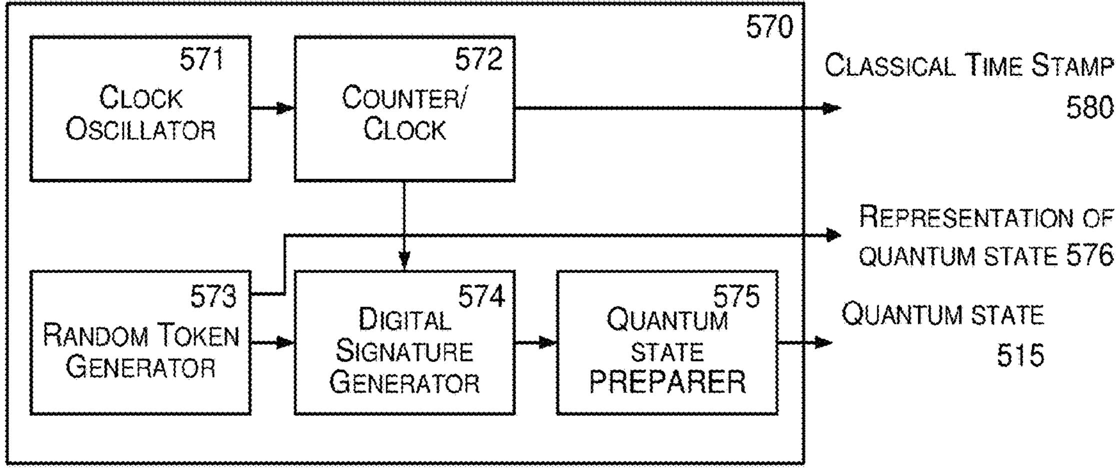
FIG. 6*a* shows a secure verifier for timestamping.

FIG. 6*a* shows an example of a verifier 510 such as verifier 210, 310, 410. In FIG. 6*a* both the quantum and classical components of the verifier 510 are shown. The verifier can be contained in a secure enclosure 570. This may be a secure tamper proof enclosure. The verifier 510 may comprise a classical clock oscillator 571 which drives a classical counter/clock 572. The classical counter/clock 572 provides a classical time stamp 580 to a timestamping device or any other entity. The verifier 510 also comprises a random token generator 573. This random token generator 573 may be classical e.g. a classical random number generator or quantum e.g. a quantum random number generator. Even when the random token generator 573 is quantum, its output may be classical. The random token generator 573 may output a classical representation 576 of a quantum state. The outputs of random token generator 573 and counter/clock 572 may be used by quantum state preparer 575 to prepare a randomly generated quantum state 515 based on the random output of random token generator 573. This may be done using the methods discussed above. In some examples a classical digital signature generator 574 may be used to sign the outputs of the random token generator 573 and the counter/clock 572 before they are provided to the quantum state preparer 575. However, in other examples the classical digital signature generator 574 may not be included and the timestamping device 230, 330 trusts the verifier 510 has not been replaced by a different device. In other examples it is sufficient to carry out periodic measurements of the length and loss characteristics (e.g. using the standard methods of optical time domain reflectometry) of the quantum channel 220, 320 to be satisfied that the verifier 510 is still present at an unchanged location, therefore is probably still trusted. In further examples a way of providing some authentication of the quantum channel 220, 320 is for the verifier 510 to calculate and send additional qubits. When these additional qubits are combined with the other random qubits, using for example a CNOT gate (with delay lines if needed to synchronise the inputs) at the timestamping device 230, 330 they will provide a sequence of deterministic measurements. These deterministic measurements form the digital signature of a string, for example a digital signature of the verifier 510 formed using a private key known to the verifier 510 and identifiable e.g. using a Certificate Authority that holds the corresponding public key that can be used to check signatures. Generating this signature at the timestamping device 230, 330 means choosing to use blocks of qubits from the random input stream for the purpose of authentication rather than timestamping, but the timestamping device 230, 330 can choose to do this at irregular, unpredictable intervals in order to authenticate the verifier 510.

In yet further examples an optical physically unclonable function (PUF) is used on the optical quantum channel 220, 320 between the verifier 510 and the timestamping device 230, 330. This is used to provide an authentication to a challenge in the form of a pulse, which may be shaped in frequency/momentum, sent from a laser at the verifier 510 over the optical quantum channel 220, 330 through the PUF and back onto a return optical quantum channel with the reflection received at the verifier 510. The laser may be switched into the optical quantum channel 230, 330 and may use time domain multiplexing or frequency domain multiplexing to prevent it interfering with other communications between the timestamping device 230, 330 and the verifier 510. The pattern of dispersion and reflected power as a function of frequency, phase and/or polarisation is uniquely associated with the PUF and may be used as a recognisable fingerprint so that the verifier 510 can recognise the timestamping device 230, 330 because of a recognisable PUF held at the timestamping device 230, 330, and in reverse the timestamping device 230, 330 may recognise the verifier 510 because of a recognisable PUF signature held at the verifier 510. The same quantum channel 220, 330 is used for the identification challenge using the PUF as is used for the transmission of the randomly generated qubits/qudits. To this end the verifier 510 and timestamping device 230, 330 may possess a bidirectional classical channel, and this may be used to provide a secure encrypted and authenticated link between the two devices, for example using the TLS (transport layer security) protocol. Over this link, it may be agreed when to switch to complementary modes, such as identity verification using a PUF. The verifier 510 may control one or more optical switches which are used to switch a PUF into the round-trip path between the timestamping device 230, 330 and the verifier 510 in order to provide measurement of a PUF in advance of a challenge pulse being sent by the timestamping device 230, 330.

The quantum state preparer 575 may then send the randomly generated quantum state 515 to the timestamping device. In some implementations, the output of the random token generator 573 may be quantum and synchronous, in which case it can also provide the function of the quantum state preparer 575. However, the verifier 510 may keep a copy or a representation of each random qubit/qudit sent, identified according to the time bin and channel it was sent in. This can be achieved by obtaining a classical random state from the random token generator 573 (which could be a classical output of a quantum random number generator) and preparing the randomly generated quantum state 515 using the quantum state preparer 575. In one example, a single bit may be used to select between a 0 in the computational basis and a 0 in the rotated basis. More generally, 2 random classical bits may be used to select between a qubit of 0 or 1 in the computational or rotated basis, and a larger number of classical bits may be used to select a state if higher dimensional qudit states are used in the implementation.

Figure 6B:
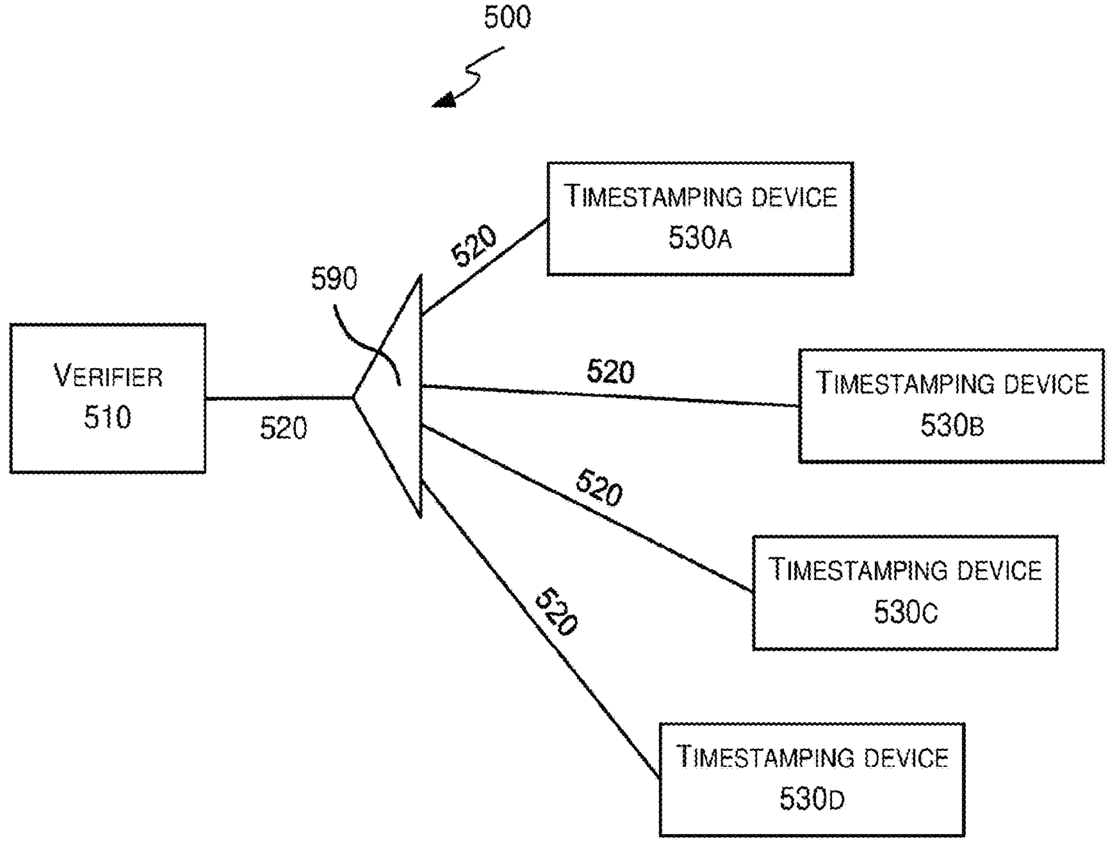
FIG. 6*b* shows how a verifier can split a quantum channel between multiple timestamping devices.

While the above examples have assumed that a verifier 210, 310, 410, 510 serves a single timestamping device 230, 330, this is by no means necessary. FIG. 6*b* shows a system 500 comprising a verifier 510 and multiple timestamping devices 530*a*-530*d*. Although FIG. 6*b* shows four timestamping devices 530*a*-530*d* another number of timestamping devices may be used. In FIG. 6*b* quantum state is being encoded in photonic qubits/qudits. FIG. 6*b* shows how a photonic quantum channel 520 can be split using a beam splitter 590 to split the quantum channel 520 between multiple timestamping devices 530*a*-530*d*. Use of classical time stamp 580 ensures each timestamping device 530*a*-530*d* knows at which time it received qubits/qudits and enables the verifier 510 to estimate the random quantum state received by each timestamping device 530*a*-530*d* based on the qubits/qudits received. In some implementations, the timestamping devices 530*a*-530*d* may buffer received qubits/qudits until they have enough qubits/qudits to be used in combination with the input token to form a timestamp proof token. One example implementation uses between 10 and 1000 received qubits to form each timestamp proof token and use of a larger number of qubits may correspond to a lower threshold probability of the timestamping device being able to forge a different input token which is still compatible with the corresponding timestamp proof token. If the implementation uses qudits rather than qubits, the required number of qudits input into the calculation and measurement of the timestamp proof token may be lower. If buffering is used, the time delay associated with buffering may be a function of the loss of the channel plus the loss of the splitter and may be accounted for in calculating the delay between the time at the source of the stream of random quantum states, and the time at the timestamping device. Quantum Non-Demolition measurements may be used to detect whether or not photons have arrived and direct them towards the buffer memory. The beam splitter 590 is passive and provides a fair split of the prepared qubits/qudits. The beam splitter 590 can be a multistage beam splitter formed from an assembly of 2-way beam splitters. In other examples a verifier 510 may have multiple quantum channels 520 each one or more quantum channels connecting it to a different timestamping device 530*a*-530*d*. This reduces loss and therefore may reduce the need for buffering but comes at the expense of the need for extra quantum channels.

Figure 7A:
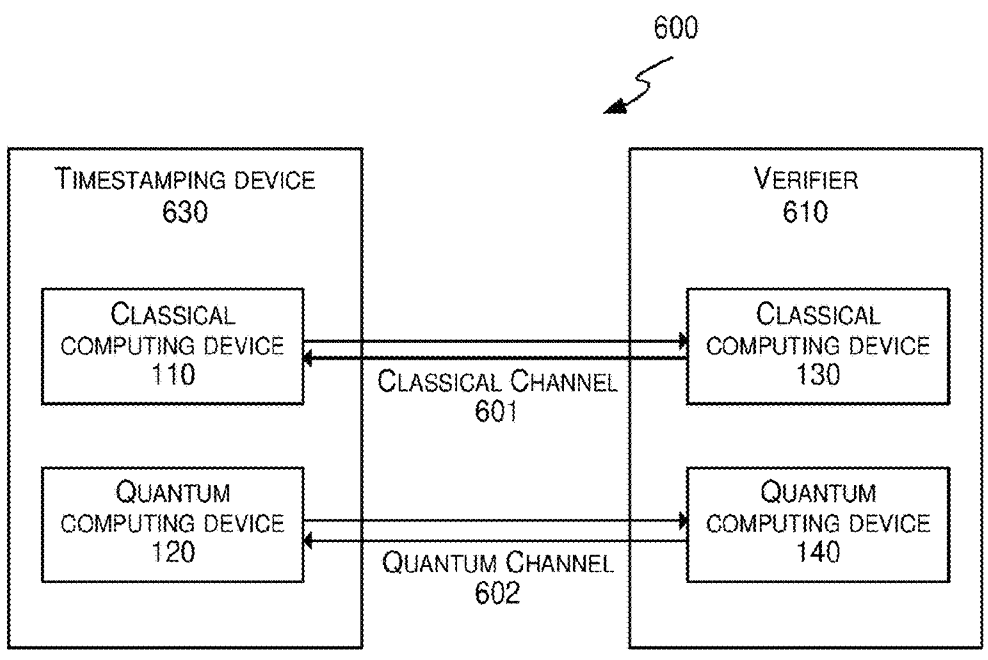
FIG. 7*a* shows an example system for performing time stamping.

Turning now to FIG. 7*a* we see an example of apparatus that can be used to implement the methods described above. The methods described above may be implemented in a system 600 comprising a timestamping device 630 and a verifier 610. The timestamping device 630 may comprise a classical computing device 110 and a quantum computing device 120. Similarly, the verifier 610 may comprise a classical computing device 130 and a quantum computing device 140. The classical computing devices 110 and 130 may be connected via a classical channel 601 and the quantum computing devices 120 and 140 may be connected via a quantum channel 602. The classical computing device 110 may be configured to interact with or control quantum computing device 120. Similarly, classical computing device 130 may be configured to control or interact with quantum computing device 140.

Figure 7B:
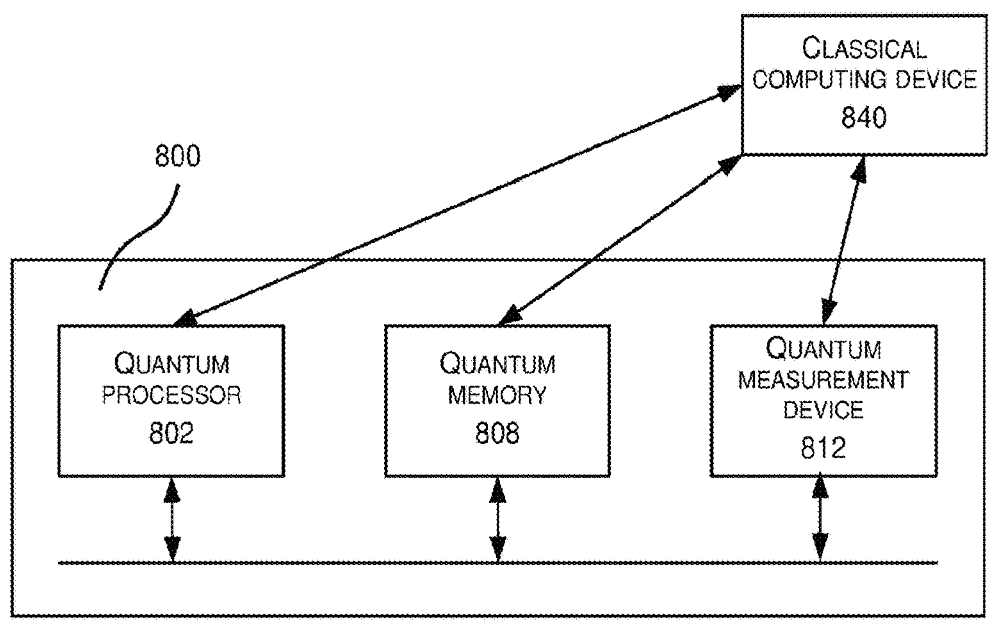
FIG. 7*b* shows an example of a quantum computing device that can be used for timestamping.

As shown in FIG. 7*b*, the quantum computing devices 120 and 140 may take the form of quantum computing device 800. Quantum computing device 800 comprises a quantum processor 802 which can implement quantum operations on a quantum state and in some cases, a quantum memory 808 that stores quantum states generated by the quantum processor 802 or to be operated on by the quantum processor 802. The quantum computer can also comprise a measurement device 812 that can perform quantum measurements on the quantum states stored in quantum memory 808 or generated by quantum processor 802. The quantum processor 802, the quantum memory 808 and the quantum measurement device 812 can all interact with a classical computing device 840. The classical computing device 840 can control the operations performed by the quantum processor 802 by either providing suitable circuits or otherwise indicating the operations the quantum processor 802 will perform to implement quantum gates. The classical computing device 840 can also interact with the quantum memory 808 and control when the memory 808 reads in or out quantum states. The classical computing device 840 can also interact with the measurement circuit 812 and drive the measurement circuit 812 to measure a quantum state. The classical computing device can also cause the quantum processor 802 and/or the quantum memory 808 to implement quantum error correction, so that for example the quantum gates behave as improved quantum gates.

Figure 7C:
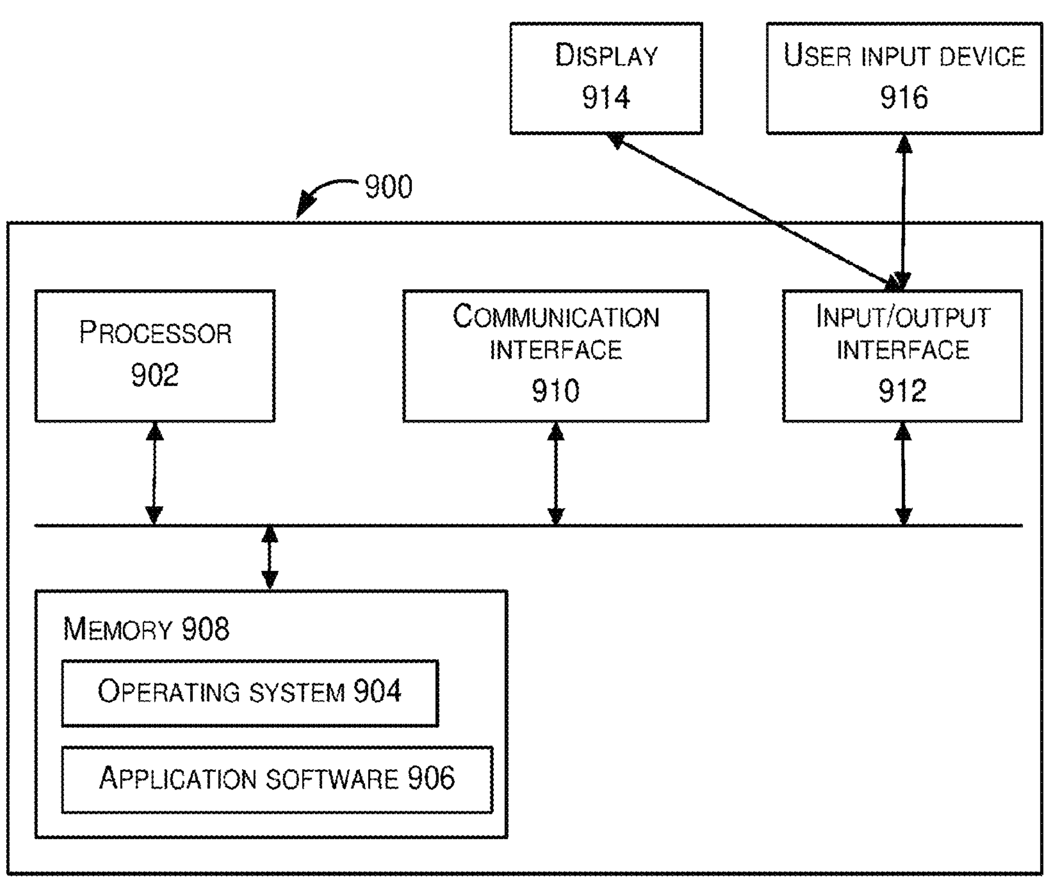
FIG. 7*c* shows an example classical computing device that can be used for timestamping.

As shown in FIG. 7*c*, the classical computing devices 110 and 130 may take the form of classical computing-based device 900. Computing-based device 900 comprises one or more processors 902 which may be microprocessors, controllers or any other suitable type of processors for processing computer executable instructions to control the operation of the device in order to implement the classical operations of the methods described above. In some examples, for example where a system on a chip architecture is used, the processors 902 may include one or more fixed function blocks (also referred to as accelerators) which implement part of the classical method in hardware (rather than software or firmware). Platform software comprising an operating system 904 or any other suitable platform software may be provided at the computing-based device to enable application software 906 to be executed on the device.

The computer executable instructions may be provided using any computer-readable media that is accessible by computing based device 900. Computer-readable media may include, for example, computer storage media such as memory 908 and communications media. Computer storage media, such as memory 908, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 908) is shown within the computing-based device 900 it will be appreciated that the storage may be distributed or located remotely and accessed via a network or other communication link (e.g. using a communication interface 910).

The computing-based device 900 also comprises an input/output interface 912 arranged to output display information to a display device 914 which may be separate from or integral to the computing-based device 900. The display information may provide a graphical user interface. The input/output interface 916 is also arranged to receive and process input from one or more devices, such as a user input device 916 (e.g. a mouse or a keyboard) and quantum computing devices such as quantum computing devices 120 and 140. In an example the display device 914 may also act as the user input device 916 if it is a touch sensitive display device. The input/output interface 912 may also output data to devices other than the display device, e.g. a locally connected printing device (not shown in FIG. 9) or quantum computing devices such as quantum computing devices 120 and 140.

The methods disclosed herein may optionally be performed with the trusted verifier located on a synchronous channel with the timestamping device but with third parties that are interested in the value of the timestamp being located on an asynchronous (or less synchronous) channel (e.g. connected over multiple internet hops). This scenario provides for an accurate, synchronous commitment which can be published over a higher latency link (e.g. on the internet) where the third parties are located.

It should be noted that it is not necessary for the trusted verifier to retain the representation of the randomly generated quantum state indefinitely: this information can instead be discarded once the verifier has confirmed and published the verification of the timestamp. Alternatively, the timekeeping device could publish a commitment transaction and commitment token in an immutable way (for example on a digital ledger like blockchain), and the verifier could then publish the associated secret qubit stream values to an immutable datastore (e.g. the same blockchain) for use by one or more independent verifiers to check the commitment token value.

In addition, it would be sufficient for the verifier to retain only samples of the representation of the randomly generated quantum state. This is because the timekeeping device cannot predict which samples will be retained and is therefore unable to exploit the fact that some information will not be checkable.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

Where the description has explicitly disclosed in isolation some individual features, any apparent combination of two or more such features is considered also to be disclosed, to the extent that such features or combinations are apparent and capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of timestamping an item at a timestamping device comprising a classical computing device and a quantum computing device, the method comprising:

at the classical computing device:

obtaining the item to be timestamped; and determining an input token based on the obtained item; and at the quantum computing device:

receiving a randomly generated quantum state from a verifier via a quantum channel wherein the randomly generated quantum state is received at time, t; and wherein the method comprises using the timestamping device to combine the randomly generated quantum state with the input token to produce a timestamp proof token associated with the time, t; and wherein using the timestamping device to combine the randomly generated quantum state with the input token comprises performing quantum operations on the randomly generated quantum state such that at least some of the quantum operations are related to the input token wherein performing quantum operations on the generated quantum state comprises measuring the randomly generated quantum state to obtain the timestamp proof token associated with the time, t.

2. The method of claim 1 wherein performing quantum operations on the randomly generated quantum state such that at least some of the quantum operations are related to the input token comprises:

measuring the randomly generated quantum state to obtain the timestamp proof token based on the input token by using the input token to determine a sequence of measurement bases for measuring the randomly generated quantum state.

3. The method claim 1 further comprising:

at the classical computing device, determining an input quantum state from the input token;

at the quantum computing device preparing a quantum register in the input quantum state; and wherein the performing of the quantum operations on the randomly generated quantum state received from the verifier such that at least some of the quantum operations are related to the input token further comprises using a sequence of quantum gates to mix the input quantum state and the randomly generated quantum state before measuring the randomly generated quantum state.

4. The method of claim 1 wherein performing quantum operations on the randomly generated quantum state such that at least some of the quantum operations are related to the input token comprises:

determining, at the classical computing device, a sequence of quantum operations based on the input token; and implementing, at the quantum computing device, the determined sequence of quantum operations on the randomly generated quantum state before measuring the randomly generated quantum state.

5. The method of claim 1 further comprising:

sending:

the timestamp proof token, and the item to be timestamped and/or the input token to the verifier within a threshold period of time of obtaining the timestamp proof token; and in response to sending the timestamp proof token to the verifier, receiving confirmation of receipt and/or validity of the timestamp proof token.

6. The method of claim 1 further comprising:

receiving a request from the verifier for at least a portion of the timestamp proof token; and providing:

the at least a portion of the timestamp proof token, and the item to be timestamped and/or the input token to the verifier in response to the request.

7. The method of claim 1 wherein determining an input token based on the obtained item comprises:

determining the input token in dependence on at least a portion of a previous timestamp proof token in the item to be timestamped or the input token.

8. The method of claim 7 wherein determining the input token in dependence on at least a portion of a previous timestamp proof token in the item to be timestamped or the input token comprises:

hashing the at least a portion of the previous timestamp proof token; and incorporating the hash of the at least a portion of the previous timestamp proof token in the item to be timestamped or the input token.

9. The method of claim 7 further comprising:

storing the timestamp proof token on a distributed ledger; and wherein determining the input token in dependence on at least a portion of a previous timestamp proof token in the item to be timestamped or the input token comprises incorporating a previous entry of the distributed ledger in the item to be timestamped or the input token.

10. The method of claim 1 wherein obtaining the item to be timestamped comprises:

receiving an item to be timestamped prior to time, t; or when no item to be timestamped has been received by time, t, obtaining a predetermined value as the item to be timestamped.

11. The method of claim 1 wherein:

receiving a randomly generated quantum state from a verifier comprises receiving a first randomly generated quantum state from a first source of the verifier and the method further comprises:

at the quantum computing device:

receiving a second randomly generated quantum state from a second source of the verifier via a quantum channel wherein the second randomly generated quantum state is received at time, t; wherein:

performing quantum operations on the randomly generated quantum state such that at least some of the quantum operations are related to the input token comprises performing quantum operations on the first and second randomly generated quantum states such that at least some of the quantum operations are related to the input token; and the first and second source of the verifier are spatially distributed around the timestamping device.

12. A method, performed at a verifier, of providing a randomly generated quantum state to a timestamping device wherein the verifier comprises a classical computing device and a quantum computing device and the method comprises:

at the quantum computing device:

preparing the randomly generated quantum state; and sending the randomly generated quantum state to the timestamping device; and at the classical computing device:

recording a representation of the randomly generated quantum state; and recording a time, t', at which the randomly generated quantum state was sent to the timestamping device;

receiving an indication of a time t, a timestamp proof token associated with the time t, and an item to be timestamped and/or an input token;

determining a time t'' based on the time t wherein the time t'' represents a time at which a randomly generated quantum state received at the timestamping device at the time t would have been sent from the verifier;

looking op a classical representation of a randomly generated quantum state associated with the time t'';

performing a classical simulation of quantum operations performed by the timestamping device; and based on results of the classical simulation, verifying that time t'' matches time t'.

13. A timestamping device for timestamping an item, the timestamping device comprising:

a classical computing device configured to:

obtain the item to be timestamped; and determine an input token based on the obtained item; and a quantum computing device configured to:

receive a randomly generated quantum state from a verifier via a quantum channel wherein the randomly generated quantum state is received at time, t; and wherein the timestamping device is configured to combine the randomly generated quantum state with the input token to produce a timestamp proof token associated with the time, t;

wherein the timestamping device being configured to combine the randomly generated quantum state with the input token comprises the timestamping device being configured to perform quantum operations on the randomly generated quantum state such that at least some of the quantum operations are related to the input token; and wherein the timestamping device being configured to perform quantum operations on the randomly generated quantum state comprises the timestamping device being configured to measure the randomly generated quantum state to obtain the timestamp proof token associated the time, t.

14. A verifier for providing a randomly generated quantum state to a timestamping device, the verifier comprising:

a quantum computing device configured to:

prepare the randomly generated quantum state; and send the randomly generated quantum state to a timestamping device; and a classical computing device configured to:

record a representation of the randomly generated quantum state and a time, t', at which the randomly generated quantum state was sent to the timestamping device;

receive an indication of a time t, a timestamp proof token associated with the time t, and an item to be timestamped and/or an input token;

determine a time t" based on the time t wherein the time t" represents a time at which a randomly generated quantum state received at the timestamping device at the time t would have been sent from the verifier;

look up a classical representation of a randomly generated quantum state associated with the time t";

perform a classical simulation of quantum operations performed by the timestamping device; and based on results of the classical simulation, verify that time t" matches time t'.

15. The verifier of claim 14 configured to carry out a link-latency calibration to determine a latency for sending the randomly generated quantum state to the timestamping device, and to randomly repeat the link-latency calibration.

16. A system comprising:

a timestamping device for timestamping an item and a verifier for providing a randomly generated quantum state to the timestamping device; the timestamping device comprising:

a classical computing device configured to:

obtain the item to be timestamped; and determine an input token based on the obtained item; and a quantum computing device configured to:

receive the randomly generated quantum state from the verifier via a quantum channel wherein the randomly generated quantum state is received at time, t; and wherein the timestamping device is configured to combine the randomly generated quantum state with the input token to produce a timestamp proof token associated with the time, t, wherein the timestamping device being configured to combine the randomly generated quantum state with the input token comprises the timestamping device being configured to perform quantum operations on the randomly generated quantum state such that at least some of the quantum operations are related to the input token, wherein the timestamping device being configured to perform quantum operations on the randomly generated quantum state comprises the time stamping device being configured to measure the randomly generated quantum state to obtain the timestamp proof token associated with the time, t;

the verifier comprising:

a quantum computing device configured to:

prepare the randomly generated quantum state; and send the randomly generated quantum state to a timestamping device; and a classical computing device configured to:

record a representation of the randomly generated quantum state and a time, t', at which the randomly generated quantum state was sent to the timestamping device.

17. A method performed using a timestamping device and a verifier, the method comprising:

at a classical computing device of the timestamping device:

obtaining an item to be timestamped; and determining an input token based on the obtained item; and at a quantum computing device of the timestamping device:

receiving a randomly generated quantum state from the verifier via a quantum channel wherein the randomly generated quantum state is received at time, t; and wherein the method comprises using the timestamping device to combine the randomly generated quantum state with the input token to produce a timestamp proof token associated with the time, t, wherein using the timestamping device to combine the randomly generated quantum state with the input token comprises performing quantum operations on the randomly generated quantum state such that at least some of the quantum operations are related to the input token, wherein the performing of the quantum operations on the randomly generated quantum state comprises measuring the randomly generated quantum state to obtain the timestamp proof token associated with the time, t; and using the verifier, to provide the randomly generated quantum state to the timestamping device by:

at a quantum computing device of the verifier:

preparing the randomly generated quantum state; and sending the randomly generated quantum state to the timestamping device; and at a classical computing device of the verifier:

recording a representation of the randomly generated quantum state; and recoding a time, t', at which the randomly generated quantum state was sent to the timestamping device.

18. The method of claim 12, wherein receiving the timestamp proof token associated with the time t comprises receiving the timestamp proof token in response to a first request sent to the timestamping device, the method further comprising:

sending a second request, subsequent to the first request, to the timestamping device and in response to the second request, receiving an indication of a time t*, a timestamp proof token associated with the time t*, and a further item to be timestamped and/or a further input token, wherein a time interval between the first request being sent and the second request being sent is random.

19. The verifier of claim 14 wherein:

to receive the timestamp proof token associated with the time t, the classical computing device is configured to receive the timestamp proof token in response to a first request sent to the timestamping device; and a second request is sent, subsequent to the first request, to the timestamping device and in response to the second request, the classical computing device is configured to receive an indication of a time t*, a timestamp proof token associated with the time t*, and a further item to be timestamped and/or a further input token, wherein a time interval between the first request being sent and the second request being sent is random.

* * * * *